US010182201B2

(12) United States Patent
Mizushiro

(10) Patent No.: US 10,182,201 B2
(45) Date of Patent: Jan. 15, 2019

(54) IMAGE PROCESSING DEVICE, DISPLAY DEVICE, AND IMAGE PROCESSING METHOD

(71) Applicant: Seiko Epson Corporation, Tokyo (JP)

(72) Inventor: Kenji Mizushiro, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 51 days.

(21) Appl. No.: 15/056,908

(22) Filed: Feb. 29, 2016

(65) Prior Publication Data
US 2016/0261819 A1 Sep. 8, 2016

(30) Foreign Application Priority Data

Mar. 2, 2015 (JP) ................................. 2015-040059

(51) Int. Cl.
| | | |
|---|---|---|
| G09G 5/02 | (2006.01) | |
| H04N 5/445 | (2011.01) | |
| G09G 5/377 | (2006.01) | |
| H04N 5/57 | (2006.01) | |

(52) U.S. Cl.
CPC ......... *H04N 5/44504* (2013.01); *G09G 5/377* (2013.01); *H04N 5/44543* (2013.01); *H04N 5/57* (2013.01)

(58) Field of Classification Search
None
See application file for complete search history.

(56) References Cited

U.S. PATENT DOCUMENTS

| | | | | |
|---|---|---|---|---|
| 5,742,277 A | * | 4/1998 | Gossett | ................... G06T 3/403 |
| | | | | 345/611 |
| 5,812,743 A | * | 9/1998 | Takahashi | ............ G06K 15/028 |
| | | | | 358/1.11 |
| 6,570,623 B1 | * | 5/2003 | Li | ........................ H04N 9/3194 |
| | | | | 348/383 |
| 6,650,792 B1 | | 11/2003 | Aida et al. | |
| 8,823,716 B2 | | 9/2014 | Ueda | |
| 2002/0060819 A1 | * | 5/2002 | Nara | .................... H04N 1/4072 |
| | | | | 358/530 |

(Continued)

FOREIGN PATENT DOCUMENTS

| | | |
|---|---|---|
| JP | 2000-148129 A | 5/2000 |
| JP | 2002-042119 A | 2/2002 |

(Continued)

OTHER PUBLICATIONS

Yates, "Illustrate and Animate a Bouncing Ball: Part 1—Adobe Flash", Dec. 19, 2008, URL: https://design.tutsplus.com/tutorials/illustrate-and-animate-a-bouncing-ball-part-1-adobe-flash--vector-966.*

*Primary Examiner* — David H Chu
(74) *Attorney, Agent, or Firm* — ALG Intellectual Property, LLC

(57) ABSTRACT

A projector is configured so as to be able to perform a plurality of types of image processing on processing target data in the case in which one of still image data and data of a frame constituting video data is input as the processing target data. A video processing section includes a selector for controlling an execution sequence of the types of image processing to be executed, and a panel correction section for outputting the processing target data having been processed in the execution sequence controlled by the control section.

14 Claims, 16 Drawing Sheets

(56) References Cited

U.S. PATENT DOCUMENTS

| | | | |
|---|---|---|---|
| 2006/0028667 A1* | 2/2006 | Saito | G06F 3/1208 358/1.13 |
| 2007/0139627 A1* | 6/2007 | Yamada | G03B 21/13 353/94 |
| 2012/0019720 A1* | 1/2012 | Nezu | G09G 5/391 348/559 |
| 2012/0086680 A1* | 4/2012 | Ueda | G09G 5/14 345/204 |
| 2013/0215138 A1* | 8/2013 | Suzuki | G06T 11/001 345/593 |
| 2014/0104582 A1 | 4/2014 | Mori | |
| 2014/0211168 A1* | 7/2014 | Yano | G06F 3/1431 353/30 |
| 2014/0223359 A1* | 8/2014 | Yamada | G06F 3/0488 715/798 |
| 2015/0058716 A1* | 2/2015 | Boothman | G06F 17/218 715/254 |
| 2015/0269913 A1* | 9/2015 | Wada | G06F 3/0482 345/635 |
| 2018/0005606 A1* | 1/2018 | Mori | G09G 5/377 |
| 2018/0139427 A1 | 5/2018 | Mori | |

FOREIGN PATENT DOCUMENTS

| | | |
|---|---|---|
| JP | 2002-207247 A | 7/2002 |
| JP | 2002-330948 A | 11/2002 |
| JP | 2006-015617 A | 1/2006 |
| JP | 2008-116874 A | 5/2008 |
| JP | 2011-188404 A | 9/2011 |
| JP | 2012-83484 A | 4/2012 |
| JP | 2012-221445 A | 11/2012 |
| JP | 2014-078872 A | 5/2014 |

\* cited by examiner

EXECUTION SEQUENCE TABLE

| EXECUTION STATE OF PROCESS | | | EXECUTION SEQUENCE |
|---|---|---|---|
| (1) EDGE BLEND | (2) OSD (MENU) | (3) OSD (DRAWING) | |
| × | × | × | N/A |
| × | × | ○ | (3) |
| × | ○ | × | (2) |
| ○ | × | × | (1) |
| ○ | ○ | × | (1)→(2) |
| ○ | × | ○ | (3)→(1) |
| × | ○ | ○ | (3)→(2) |
| ○ | ○ | ○ | (3)→(2)→(1) |

FIG. 8

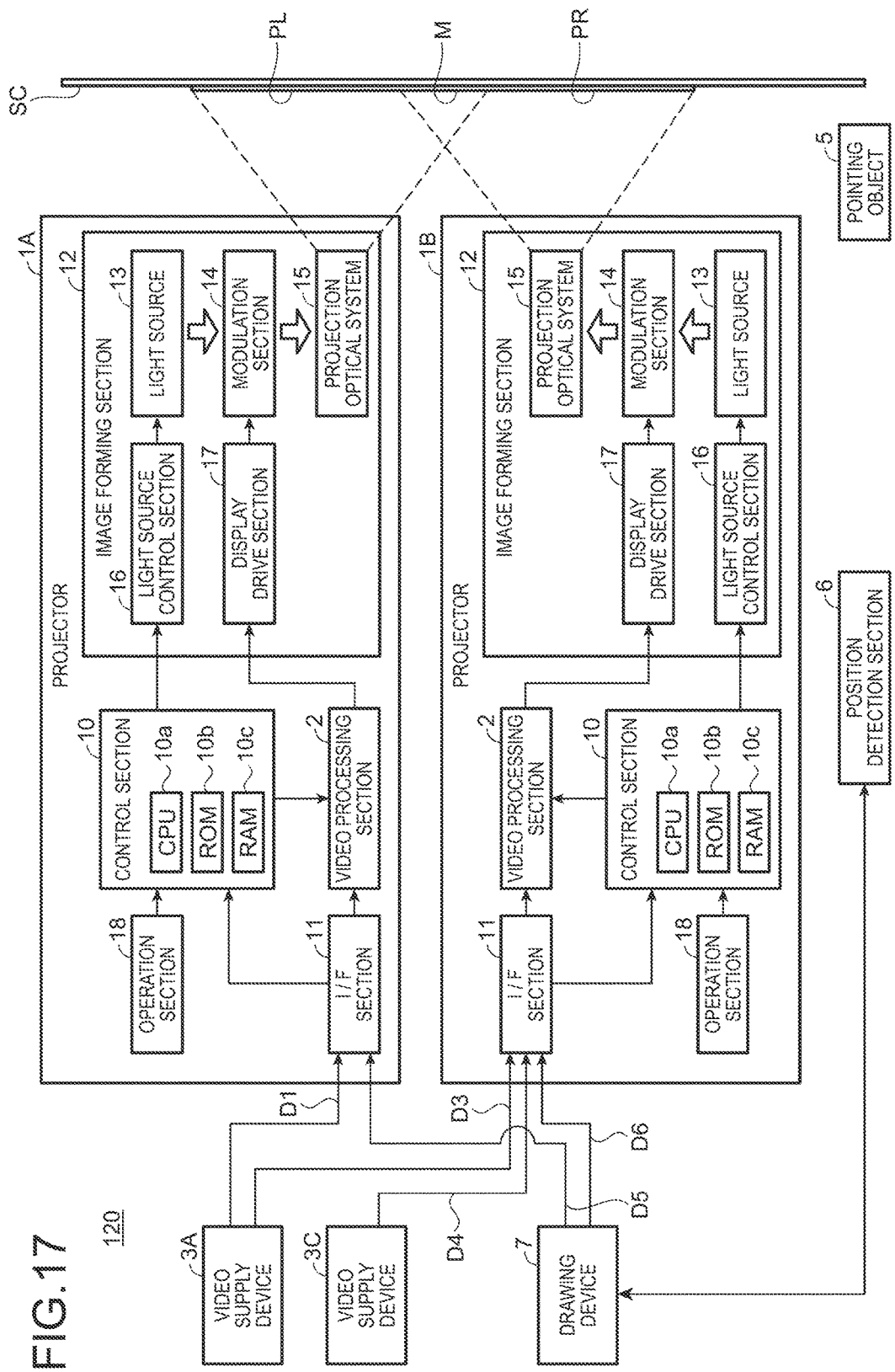

IMAGE PROCESSING DEVICE, DISPLAY DEVICE, AND IMAGE PROCESSING METHOD

The entire disclosure of Japanese Patent Application No. 2015-040059, filed Mar. 2, 2015 is expressly incorporated by reference herein.

BACKGROUND

1. Technical Field

The present invention relates to an image processing device, a display device, and an image processing method.

2. Related Art

In the past, there has been known a method of performing a plurality of types of processes on an input image and then displaying the input image (see, e.g., JP-A-2008-116874 (Document 1)). The device of Document 1 is a system provided with a plurality of projectors, and performs a process of displaying an image drawn by a drawing tool so as to be superimposed on an input image, and a process of decreasing the luminance of a superimposition part where the images by the projectors are superimposed on each other.

In the case of performing the plurality of processes on an image, there is a possibility that the condition of the image obtained by completing the processes is dramatically affected by the execution sequence of the processes. Therefore, it is possible to previously fix the execution sequence of the processes so that the final image becomes in a desired condition. For example, in the system of Document 1, the sequence is fixed so that the process of decreasing the luminance of the superimposition part is performed after the process of superimposing the image drawn on the input image.

Incidentally, in a device or a system capable of performing a larger number of types of processes, the processes performed are not necessarily all of the executable processes, and there is a possibility that it is not achievable to obtain the desired result by keeping the same execution sequence. In order to deal with such a problem, it is concerned that the control related to the image processing becomes complicated so as to cope with a variety of cases, and in the hardware circuit for performing the image processing, for example, the circuit configuration becomes complicated.

SUMMARY

An advantage of some aspects of the invention is to provide an image processing device, a display device, and an image processing method each capable of efficiently performing a plurality of processes in an appropriate execution sequence in the case of performing the processes on an image or a video picture as a processing target.

An image processing device according to an aspect of the invention includes a device adapted to input one of still image data and data of a frame constituting video data as processing target data, and capable of performing a plurality of types of image processing on the processing target data, a control section adapted to control an execution sequence of the types of image processing, and an output section adapted to output the processing target data having been processed in the execution sequence controlled by the control section.

According to this aspect of the invention, the execution sequence of the plurality of types of image processing on the processing target data can be controlled. For example, the control section changes the execution sequence of the plurality of types of image processing. Therefore, in the case of performing the plurality of processes on the image or the video picture as the processing target, the processes can efficiently be performed in an appropriate execution sequence.

According to another aspect of the invention, in the image processing device described above, in at least either of the types of image processing, the process is executed on the entire processing target data as a processing target.

According to this aspect of the invention, in the case in which the execution sequence of the image processing significantly affects the result passing through the plurality of types of image processing, the plurality of types of image processing can be performed in an appropriate execution sequence.

According to another aspect of the invention, in the image processing device described above, the control section controls execution and non-execution of each of the types of image processing to control the execution sequence of the types of image processing to be executed.

According to this aspect of the invention, execution or non-execution can be controlled with respect to the plurality of types of image processing on the processing target data. Therefore, in the case of performing the plurality of processes on the image or the video picture as the processing target, the processes can efficiently be performed.

According to another aspect of the invention, in the image processing device described above, the execution sequence of the types of image processing is set in advance in accordance with a combination of execution and non-execution of each of the types of image processing.

According to this aspect of the invention, the execution sequence can promptly be determined based on the necessity of the execution of each of the types of image processing. Further, the burden of the process for determining the execution sequence can be reduced.

According to another aspect of the invention, in the image processing device described above, the plurality of types of image processing includes a process of superimposing another image on an image based on the processing target data.

According to this aspect of the invention, the plurality of types of image processing can be executed in the appropriate execution sequence in the case in which the influence of the execution sequence of the image processing is significant.

According to another aspect of the invention, in the image processing device described above, the plurality of types of image processing includes a process of varying luminance of the image based on the processing target data in accordance with an in-plane luminance distribution set in advance.

According to this aspect of the invention, the plurality of types of image processing can be executed in the appropriate execution sequence in the case in which the influence of the execution sequence of the image processing is significant.

According to another aspect of the invention, in the image processing device described above, there is further provided a plural process execution section adapted to perform the plurality of types of image processing, and the control section controls execution and non-execution with respect to each of the types of image processing performed by the plural process execution section.

According to this aspect of the invention, the execution sequence of the case in which the plurality of processes is performed by a single process execution section can appropriately be controlled. Therefore, the degree of freedom of the circuit configuration is enhanced, and it is possible to achieve higher efficiency.

According to another aspect of the invention, in the image processing device described above, the control section controls the execution sequence in a case of performing the plurality of types of image processing including a luminance varying process of varying the luminance in accordance with a position in a plane, and a menu OSD process of superimposing a display object for menu screen on the processing target data with respect to the processing target data so that the luminance varying process is performed prior to the menu OSD process.

According to this aspect of the invention, in the case of superimposing the display object for the menu screen on the processing target data, since the luminance varying process does not affect the display object, the display object for the menu screen can be set in the state of being clearly and visually recognized.

According to another aspect of the invention, in the image processing device described above, the control section controls the execution sequence in a case of performing the plurality of types of image processing including a luminance varying process of varying the luminance in accordance with a position in a plane, and an image OSD process of superimposing a display object including an image on the processing target data with respect to the processing target data so that the image OSD process is performed prior to the luminance varying process.

According to this aspect of the invention, in the case of superimposing the display object including an image on the processing target data, it is possible to apply the luminance varying process to the display object, and therefore, the luminance of the entire processing target data can be adjusted without a feeling of strangeness.

A display device according to still another aspect of the invention includes a device adapted to input one of still image data and data of a frame constituting video data as processing target data, and capable of performing a plurality of types of image processing on the processing target data, a control section adapted to control an execution sequence of the types of image processing, and a display section adapted to display an image based on the processing target data having been processed in the execution sequence controlled by the control section.

According to this aspect of the invention, it is possible to control execution and non-execution of each of the types of image processing on the processing target data, and the execution sequence of the image processing. For example, the control section changes the execution sequence of the plurality of types of image processing. Therefore, in the case of performing the plurality of processes on the image or the video picture as the processing target, the processes can efficiently be performed in an appropriate execution sequence.

An image processing method according to yet another aspect of the invention includes: inputting one of still image data and data of a frame constituting video data as processing target data, and controlling an execution sequence of a plurality of types of image processing which can be executed on the processing target data, executing the types of image processing on the processing target data in the execution sequence, and outputting the processing target data having been processed.

According to this aspect of the invention, it is possible to control execution and non-execution of each of the types of image processing on the processing target data, and the execution sequence of the image processing. For example, the execution sequence of the plurality of types of image processing can be changed. Therefore, in the case of performing the plurality of processes on the image or the video picture as the processing target, the processes can efficiently be performed in an appropriate execution sequence.

BRIEF DESCRIPTION OF THE DRAWINGS

The invention will be described with reference to the accompanying drawings, wherein like numbers reference like elements.

FIG. 8 is a schematic diagram showing a configuration of an execution sequence table provided to the projector.

FIG. 17 is a configuration diagram of a second modified example of the projection system.

DESCRIPTION OF AN EXEMPLARY EMBODIMENT

An embodiment to which the invention is applied will hereinafter be described with reference to the accompanying drawings.

Figure 1:
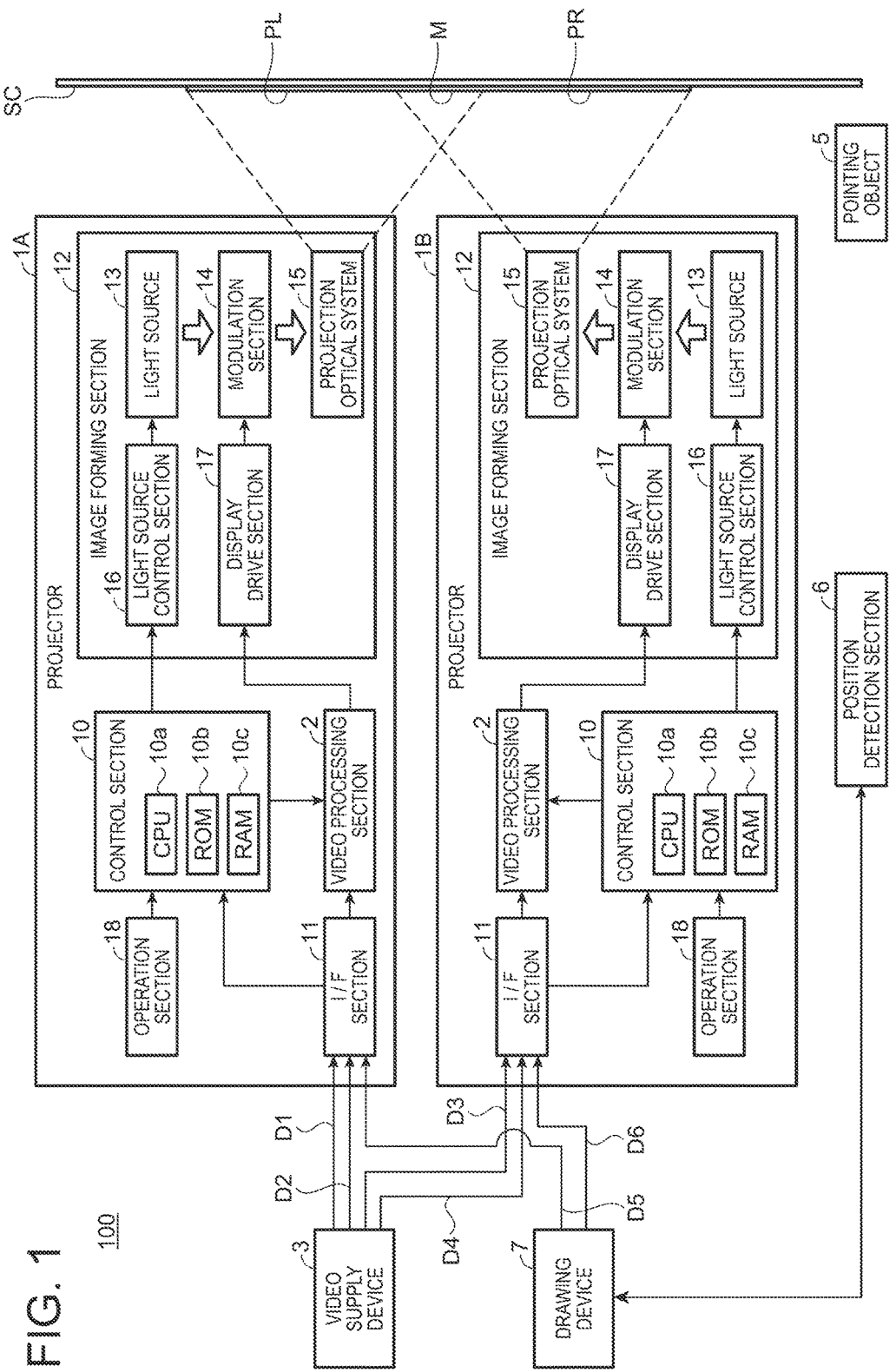
FIG. 1 is a configuration diagram of a projection system according to an embodiment of the invention.

FIG. 1 is a configuration diagram of a projection system 100 according to the embodiment to which the invention is applied.

The projection system 100 is provided with a plurality of projectors 1A, 1B, and a video supply device 3 for supplying the projectors 1A, 1B with the data of a processing target.

In the projection system 100 according to the present embodiment, the projectors 1A, 1B are arranged side by side in a lateral (horizontal) direction, and each project an image on a screen SC constituting a single surface. Therefore, a projection image PL of the projector 1A and a projection image PR of the projector 1B are arranged on the screen SC side by side in the lateral direction. Further, as described later, the projection image PL and the projection image PR are projected so as to partially be superimposed. Therefore, on the screen SC, there occurs a superimposition part M where the projection image PL and the projection image PR are superimposed on each other.

The number of projectors provided to the projection system 100 is arbitrary, and it is possible to, for example, arrange three or more projectors in a horizontal direction, or arrange them in a vertical (perpendicular) direction, or adopt a configuration provided with a larger number of projectors.

In the projection system 100, it is possible to display images different from each other respectively in the projector 1A and the projector 1B. Further, it is also possible for the projection image PL of the projector 1A and the projection image PR of the projector 1B to form a single large image on the screen SC.

Further, as described later, each of the projectors 1A, 1B is capable of projecting a composite image combined by incorporating a main video picture and a sub-video picture with each other. It is possible to input main video pictures different from each other and sub-video pictures different from each other respectively to the projector 1A and the projector 1B, and each of the projectors 1A, 1B performs the process of combining the main video picture and the sub-video picture to project the composite image on the screen SC. To the projector 1A, data D1 as video data constituting the main video picture and data D2 as video data constituting the sub-video picture can be input from the video supply device 3. Further, to the projector 1B, data D3 as video data constituting the main video picture and data D4 as video data constituting the sub-video picture can be input from the video supply device 3.

As the video supply device 3, there can be cited, for example, a video reproduction device such as a DVD player, a broadcast reception device such as a digital television tuner, and a video output device such as a video game machine or a personal computer. The video supply device 3 can also be a communication device or the like for communicating with a personal computer or the like to receive the video data. Further, the video supply device 3 is not limited to a device for outputting digital video data, but can also be a device for outputting an analog video signal. In this case, it is sufficient to provide an output side of the video supply device 3 or an interface section 11 of each of the projectors 1A, 1B with an analog/digital conversion device for generating the digital video data from the analog video signal. Further, a specific specification and the number of connectors and interface circuits provided to the interface section 11 are arbitrary.

The video supply device 3 outputs the digital video data in a data format which the interface section can deal with. The data format specifically includes resolution, a frame rate, the number of grayscale levels (the number of colors), a color space, a transfer rate, and so on. The projectors 1A, 1B can operate even in the case in which still image data is input from the video supply device 3. In this case, the data output by the video supply device 3 is in the state in which a plurality of frames continues at substantially the same frame rate as that of the data format of the video data, and images of the respective frames are the same as each other. In other words, in the data input from the video supply device 3 to the projectors 1A, 1B, the content of the data can be a still image or a video picture (a moving image) providing the data has the data format which the interface section 11 can deal with. In the following description, the data input from the video supply device 3 to the projectors 1A, 1B is called video data.

The video supply device 3 can be provided with a function of controlling the projection system 100 as a personal computer. Further, the video data output by the video supply device 3 is not limited to the data stored in the video supply device 3. The video supply device 3 can output data obtained by the video supply device 3 using, for example, a portable storage medium or a communication network to the projectors 1A, 1B. Further, the video supply device 3 controls the relative position between the projection images of the projectors 1A, 1B in the projection system 100, and the area ratio and the length ratio between the projection image of the projector 1A, the projection image of the projector 1B, and the superimposition part M.

For example, the video supply device 3 executes application software for managing multi-projection by the projection system 100. The video supply device 3 divides the image to be projected by the projection system 100, then generates images corresponding respectively to the projectors 1A, 1B, and then outputs the images thus generated as the video data. Further, it is also possible for the video supply device 3 to output control data for a configuration to configure the processing content with respect to the process to be performed on the video data in each of the projectors 1A, 1B.

Further, the projection system 100 is provided with a position detection section 6 for detecting a position pointing operation on the screen SC and a drawing device 7 for obtaining the data of the position detected by the position detection section 6 to perform a drawing process.

A pointing object 5 has a main body having, for example, a pen-like shape, and is used by the user holding the pointing object 5 in hand. The position detection section 6 detects the position pointed by the pointing object 5 targeting a predetermined position detection range on the screen SC. When the user points an arbitrary position on the screen SC with the pointing object 5, the position detection section 6 detects the pointed position to output coordinate data representing the pointed position to the drawing device 7.

The position detection range in which the position detection section 6 can detect the pointed position is set to, for example, a range including a display region in which the projectors 1A, 1B project the video pictures. As a specific method of the position detection section 6 for detecting the pointed position by the pointing object 5, it is possible to use a method of, for example, providing the position detection section 6 with an imaging element, and detecting an image of the pointing object 5 from the taken image data. In this case, it is possible to use, for example, a finger of the user as a pointing object instead of the pointing object 5. Further, there is a method in which, for example, the pointing object 5 is provided with a light emitting section for emitting infrared light, visible light, ultraviolet light, or the like, and the position detection section 6 detects the light emission of the pointing object 5. It is obviously possible to use other methods.

The drawing device 7 draws an image in accordance with the coordinate data input from the position detection section 6. For example, the drawing device 7 draws a geometric figure having the position pointed by the pointing object 5 as a vertex, and an image of a straight line or a curved line along a trajectory of the pointed position by the pointing object 5. A variety of attributes of the image to be drawn such as a shape, a color, the thickness of the line, and a configuration related to filling can be designated using the pointing object 5. Specifically, the projectors 1A, 1B project operating images such as a menu bar in which icons for a menu operation are arranged. When the user points the position of the operating image using the pointing object 5, the position detection section 6 detects the pointed position. In the case in which the coordinate data of the pointed position is the data representing the position corresponding to the operating image, the drawing device 7 identifies the function assigned to the operating image, and then performs the function thus identified to perform setting of the attribute related to drawing, and so on.

In the case in which the image has been drawn, the drawing device 7 outputs the data D5, D6 of the image thus drawn to the projectors 1A, 1B, respectively. Here, it is also possible for the drawing device 7 to output the whole of the image thus drawn to both of the projectors 1A, 1B. In this case, the data D5, D6 are the data having the same contents. Further, it is also possible for the drawing device 7 to divide the image thus drawn so as to correspond respectively to the projectors 1A, 1B to output the data D5 representing the image obtained by the division to the projector 1A, and to output the data D6 representing the image obtained by the division to the projector 1B.

Further, it is also possible for the drawing device 7 to output the coordinate data of the pointed position detected by the position detection section 6 to the projectors 1A, 1B. In this case, in each of the projectors 1A, 1B, the control section 10 can perform drawing based on the coordinate.

In the case in which the video supply device 3 is formed of a device having a control function such as a personal computer, the function of the drawing device 7 can be implemented in the video supply device 3. In other words, it is also possible for the position detection section 6 for detecting the pointed position by the pointing object 5 to be connected to the video supply device 3. Further, it is also possible for the position detection section 6 to be formed of a sensor (including a camera), and it is also possible for the video supply device 3 to perform the function of identifying the pointed position based on the detection result of the sensor.

The projectors 1A, 1B as display devices are each provided with the interface (I/F) section 11 to which an external device can be connected. It is possible to connect a plurality of devices to the interface section 11, and the type of the device, which can be connected, is not particularly limited. In the present embodiment, the video supply device 3 and the drawing device 7 are connected to the interface section 11.

In the present embodiment, since the projectors 1A, 1B are projectors having the same configuration, the projector 1A will hereinafter be described. The constituents common to the projectors 1A, 1B are denoted by the same reference symbols in the drawings, and the explanation thereof will be omitted.

The projector 1A is provided with a control section 10 for controlling each section of the projector 1A, and an image forming section 12 for displaying (projecting) the video picture, which is based on the video data input to the interface section 11, on the screen SC. Further, to the interface section 11, there is connected a video processing section 2 (an image processing device) for processing the video data to output the video signal for display to the image forming section 12.

The image forming section 12 (the display section) is provided with a light source 13, a modulation section 14, a projection optical system 15, a light source control section 16, and a display drive section 17.

The light source 13 is formed of lamps such as a xenon lamp or a super-high pressure mercury lamp, or a solid-state light source such as an LED or a laser source. The light source 13 is put on with the electrical power supplied from the light source control section 16, and emits light toward the modulation section 14. The light source control section 16 can control the emission luminance of the light source 13 due to the control by the control section 10.

The modulation section 14 modulates the light emitted from the light source 13 to generate the image light, and then irradiates the projection optical system 15 with the image light. In the present embodiment, there is illustrated a configuration in which the modulation section 14 is provided with three liquid crystal light valves corresponding respectively to the colors of red (R), green (G), and blue (B), and the liquid crystal light valves are made to transmit the light emitted by the light source 13.

To the three liquid crystal light valves of the modulation section 14, there is connected the display drive section 17. The display drive section 17 drives each of the pixels of the liquid crystal light valves based on the video signal output by the video processing section 2 to draw an image on the liquid crystal light valves frame by frame (screen by screen).

It is also possible to dispose a reflector, a lens group, a polarization plate, a dimming element, and so on (not shown) on the light path between the light source 13 and the modulation section 14, or in the modulation section 14. Further, the modulation section 14 can be provided with a configuration using reflective liquid crystal panels. In this case, the modulation section 14 makes the liquid crystal panels reflect the light emitted by the light source 13 to guide the reflected light to the projection optical system 15. Further, it is also possible to provide the modulation section 14 with a configuration using digital mirror devices (DMD), or with a configuration provided with a single DMD and a color wheel.

The projection optical system 15 guides the image light having been modulated by the modulation section 14 toward the screen SC to form the image on the screen SC. The projection optical system 15 can be provided with a configuration having an optical element such as a prism for combining light beams having passed through the respective three liquid crystal light valves, a lens group for guiding the image light, or a mirror. Further, the projection optical system 15 can also be provided with a zoom lens for performing expansion and contraction of the video picture on the screen SC, a focus lens for performing focus adjustment, a zoom adjusting motor for adjusting a zooming level, a focus adjusting motor for performing the focus adjustment, and so on.

The video processing section 2 performs a process described later such as a color correction on the video data to be input to the interface section 11 in accordance with the control of the control section 10. The video data having been processed by the video processing section 2 is converted into the video signal frame by frame, and is then input to the display drive section 17.

The control section 10 is configured including a processor for controlling sections of the projector 1A. The control section 10 is provided with, for example, a CPU 10a, a ROM 10b, and a RAM 10c, and controls the sections of the projectors 1A, 1B by the CPU 10a performing a program stored by the ROM 10b. It is also possible to connect a nonvolatile storage section (not shown) to the control section 10 to allow the control section 10 to execute a program stored by the storage section. Further, the control section 10 is not limited to the configuration for performing the control of the projector 1A with the software, but can also be configured with hardware such as an application specific integrated circuit (ASIC).

The control section 10 controls execution timing, execution conditions, and so on of the process executed by the video processing section 2. Further, the control section 10 controls the light source control section 16 of the image forming section 12 to thereby perform an adjustment of the luminance of the light source 13, and so on.

The control section 10 obtains the data D5 input by the drawing device 7 into the interface section 11 to perform the process of writing the data D5 to a DRAM 22 (FIG. 2) provided to the video processing section 2. Further, the control section 10 performs the process of writing an OSD image described later to the DRAM 22.

Further, the projector 1B is configured similarly to the projector 1A described above.

Figure 2:
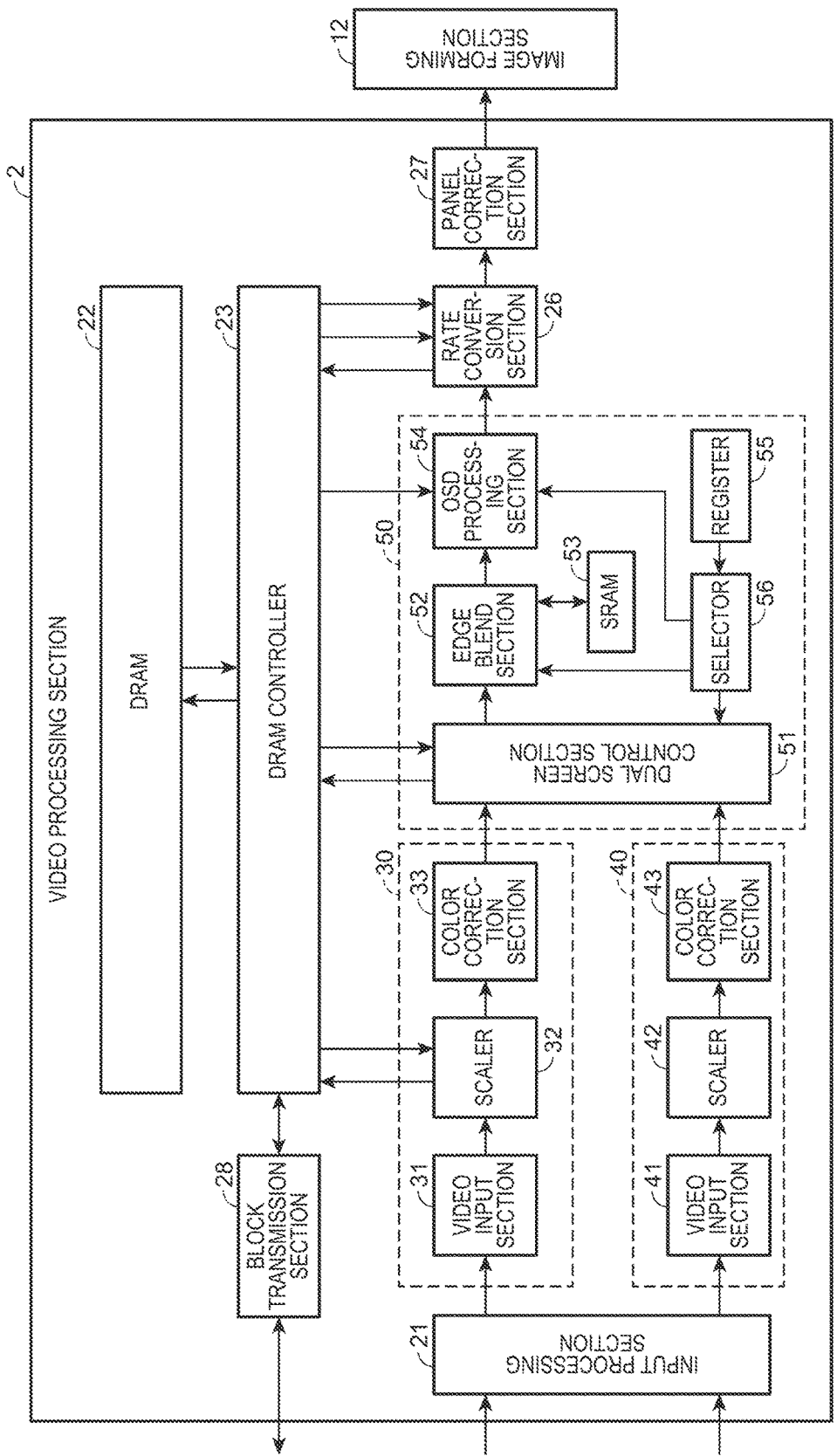
FIG. 2 is a functional block diagram of a video processing section provided to a projector.

FIG. 2 is a functional block diagram showing the video processing section 2 provided to the projector 1A in detail. The video processing section 2 provided to the projector 1B is also configured similarly.

The video processing section 2 is provided with an input processing section 21 to which the video data is input from the interface section 11, a variety of processing sections for processing the video data input to the input processing section 21, and a memory for storing the video data thus processed. The specific specification of the memory provided to the video processing section 2 is not particularly limited, and a volatile memory and a nonvolatile memory can also be adopted.

In the present embodiment, there will be described a configuration in which the video processing section 2 is provided with the DRAM 22 as a memory for storing the video data, and a DRAM controller 23 for controlling writing and reading of the video data to and from the DRAM 22 is connected to the DRAM 22. The DRAM 22 also functions as a so-called frame memory, and stores the video data frame by frame. Further, it is also possible to store the frame of the video data and control data related to the frame so as to correspond to each other.

The DRAM controller 23 is connected to each of a rate conversion section 26, a block transmission section 28, a scaler 32, a dual screen control section 51, and an OSD processing section 54. The DRAM controller 23 performs arbitration in accordance with the memory write request and the memory read request of the processing sections described above to control writing (write) and reading (read) with respect to the DRAM 22.

The video processing section 2 can be implemented as, for example, a single ASIC, and it is also possible to incorporate the DRAM 22 in the ASIC, or to externally connect the DRAM 22 to the ASIC.

To the input processing section 21, there are connected a main video path 30 and a sub-video path 40 in parallel to each other. The main video path 30 is provided with a video input section 31, the scaler 32, and a color correction section 33, and the color correction section 33 is connected to a layer processing section 50. Further, the sub-video path 40 is provided with a video input section 41, a scaler 42, and a color correction section 43, and the color correction section 43 is connected to the layer processing section 50.

The input processing section 21 outputs the video data input from the interface section 11 to both or either of the main video path 30 and the sub-video path 40. Among the main video path 30 and the sub-video path 40, the output destination, to which the input processing section 21 outputs the video data, is set due to the control of the control section 10 (FIG. 1). In the present embodiment, the input processing section 21 outputs the data of the main video picture to the main video path 30, and outputs the data of the sub-video picture to the sub-video path 40.

Further, in the input processing section 21, it is also possible to perform a process on the video data input from the interface section 11 to output the video data having been processed to both or either of the main video path 30 and the sub-video path 40. As the process performed by the input processing section 21, there can be cited, for example, a noise rejection process, a conversion process of 2D (planar) video data into 3D (stereoscopic) video data, an intermediate frame generation (a frame interpolation) process, and a sharpening process. Further, it is also possible for the input processing section 21 to perform a shape correction process (e.g., a keystone distortion correction process for correcting the keystone distortion).

The video input section 31 provided to the main video path 30 obtains the video data input from the input processing section 21, and then outputs the video data to the scaler 32.

The scaler 32 performs a resolution conversion process for expanding or contracting the frame on the video data output by the video input section 31. Further, the scaler 32 can be provided with a configuration of performing the sharpening process such as a super-resolution process in the case of increasing the resolution. The scaler 32 synchronizes the timing of the resolution conversion process with the timing, at which the video input section 31 outputs the video data, to thereby output the video data with the converted resolution to the color correction section 33 without writing the video data to the DRAM 22. Further, it is also possible for the scaler 32 to write the frame of the video data output by the video input section 31 to the DRAM 22, and then output the frame of the video data after converting the resolution of the frame of the video data thus written. In other words, the scaler 32 can be provided with a configuration of performing the resolution conversion process accompanied by writing and reading to and from the DRAM 22.

The color correction section 33 performs the color correction process on the video data. The color correction process includes, for example, a gamma correction process of the video data, and a process of correcting the color characteristics. In these processes, for example, the control section 10 calculates the correction parameters to set the correction parameters to the color correction section 33 in accordance with the adjustment value or the target value input by the user with an operation of an operation section 18 (FIG. 1), and then the color correction section 33 performs the correction based on the parameters set by the control section 10.

Similarly to the video input section 31, the video input section 41 obtains the video data input from the input processing section 21, and then outputs the video data to the scaler 42.

The scaler 42 is configured similarly to the scaler 32. The scaler 42 performs the resolution conversion process, which is not accompanied with writing and reading to and from the DRAM 22, on the video data output by the video input section 41, and then outputs the video data having been processed to the color correction section 43. The color correction section 43 performs the color correction process on the video data in accordance with the control of the control section 10 similarly to the color correction section 33.

The video processing section 2 is provided with a layer processing section 50. The layer processing section 50 is provided with the dual screen control section 51, an edge blend section 52, an SRAM 53, the OSD processing section 54, a register 55, and a selector 56.

Figure 3A:
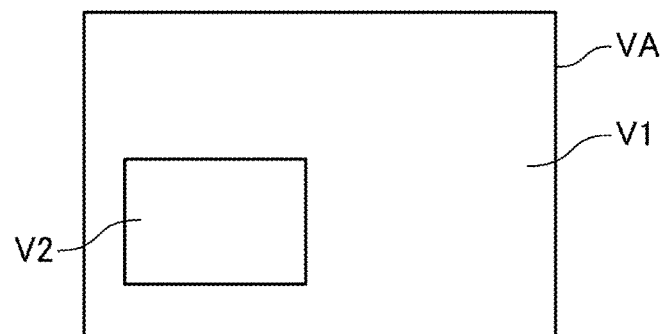
FIGS. 3A through 3D are explanatory diagrams of functions of the projector.
Figure 3B:
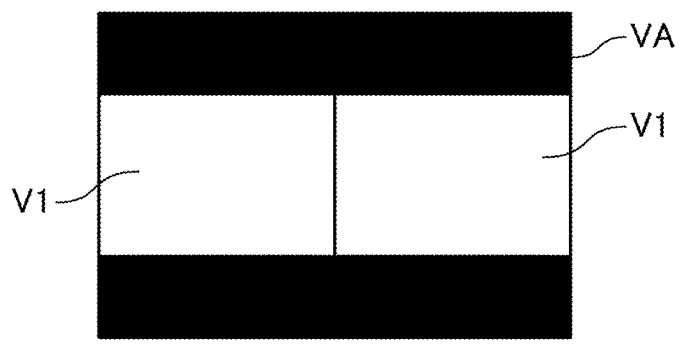
Figure 3C:
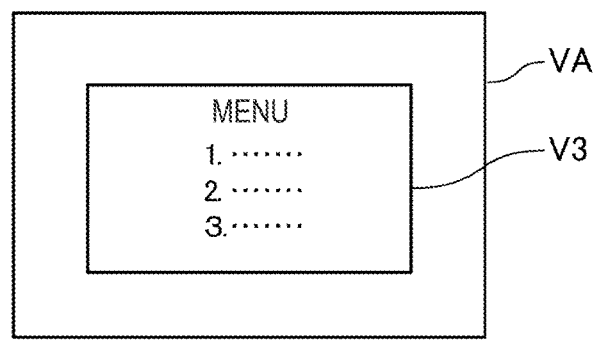
Figure 3D:
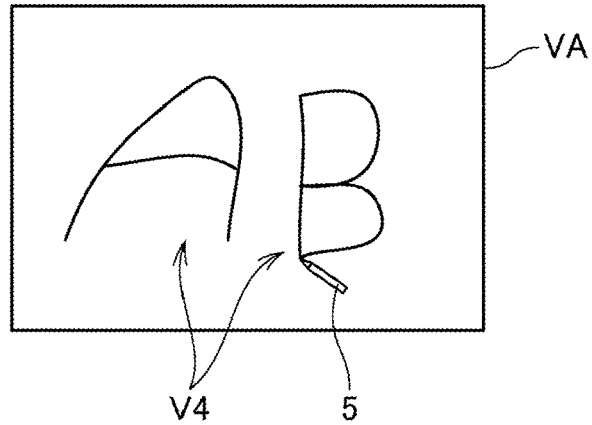

Hereinafter, the operation of the layer processing section 50 will be described with reference to FIGS. 2, 3A through 3D, and 4A through 4D. FIGS. 3A through 3D and 4A through 4D are explanatory diagrams of the functions of the projectors 1A, 1B, and show in particular the function of the layer processing section 50. FIG. 3A shows a configuration of composite video data generated by the dual screen control section 51, and FIG. 3B shows another configuration of the composite video data. FIG. 3C shows an example of an image superimposed by the OSD processing section 54, and FIG. 3D shows another example of the image superimposed by the OSD processing section 54.

Figure 4A:
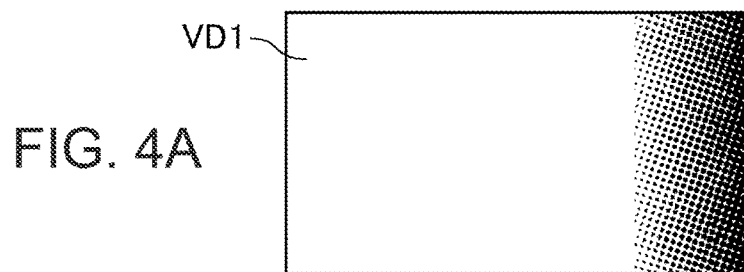
FIGS. 4A through 4D are explanatory diagrams of functions of the projector.
Figure 4B:
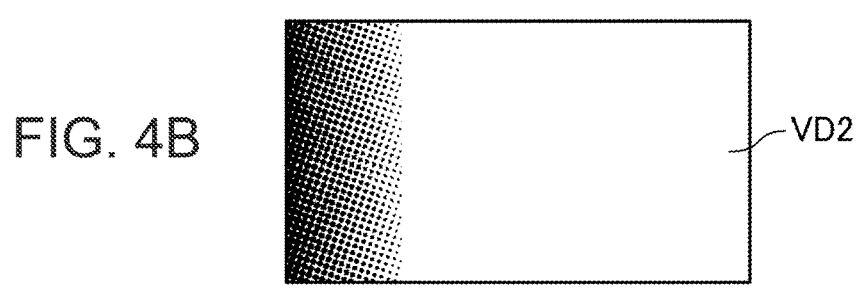
Figure 4C:
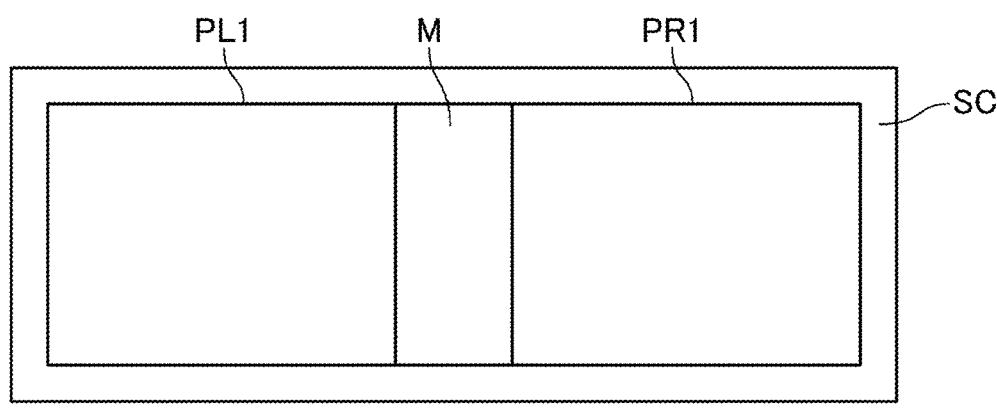
Figure 4D:
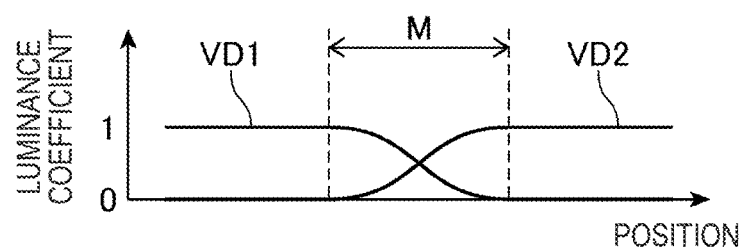

FIG. 4A shows how the edge blend section 52 of the projector 1A performs the process, and FIG. 4B shows how the edge blend section 52 of the projector 1B performs the process. Further, FIG. 4C shows a projection image in the case of performing the process of the edge blend section 52, and FIG. 4D is a diagram showing the characteristics of the video data processed in the edge blend section 52.

The layer processing section 50 is provided with the dual screen control section 51, the edge blend section 52, and the OSD processing section 54 as processing sections for performing the image processing on the video data. It is also possible to include the SRAM 53 in the processing sections together with the edge blend section 52.

In the layer processing section 50, a selector 56 connected to each of the processing sections controls whether or not each of the processing sections performs the process in accordance with the setting value of the register 55. Each of the dual screen control section 51, the edge blend section 52, and the OSD processing section 54 performs the process due to the control of the selector 56. Further, in the case in which the control is performed so that the process is not performed, the dual screen control section 51, the edge blend section 52, and the OSD processing section 54 each directly output the video data input in a pass-through manner. The selector 56 is capable of controlling execution/non-execution of the process in the respective processing sections independently of each other.

Further, the selector 56 controls the execution sequence of the processes of the respective processing sections in accordance with the setting value of the register 55. In the example shown in FIG. 2, there is shown a configuration of performing the processes on the video data having been processed by the main video path 30 or the sub-video path 40 in the order of the dual screen control section 51, the edge blend section 52, and the OSD processing section 54. In the layer processing section 50, it is also possible to perform the processes on the video data output by the main video path 30 or the sub-video path 40 in the order of the edge blend section 52, the OSD processing section 54, and the dual screen control section 51.

The content controlled by the selector 56 is determined based on the setting value held by the register 55. The register 55 stores (holds) the setting value for determining execution/non-execution of the process with respect to each of the processing sections of the layer processing section 50, and the setting value for determining the execution sequence of the processes in the layer processing section 50. The setting values of the register 55 can be written by the control section 10.

In other words, the layer processing section 50 performs the processes set by the control section 10 in the order set by the control section 10.

The dual screen control section 51 performs a dual screen generation process in accordance with the control of the control section 10. In the dual screen generation process, the dual screen control section 51 combines the two video data respectively input from the main video path 30 and the sub-video path 40 to generate the composite video data. The dual screen control section 51 is capable of outputting the composite video data, which has been generated by the dual screen generation process, to the DRAM controller 23 to write the composite video data to the DRAM 22. It is also possible for the dual screen control section 51 to write at least one of the video data to the DRAM 22 in order to adjust the timing between the video data input from the main video path 30 and the video data input from the sub-video path 40 in the dual screen generation process. Further, the dual screen control section 51 can also output the composite video data.

It is also possible for the dual screen control section 51 to write the video data input from either of the main video path 30 and the sub-video path 40 to the DRAM 22 without performing the process of generating the composite video data described above on the video data. The operation of the dual screen control section 51 is controlled by the control section 10. In other words, whether or not the dual screen control section 51 performs the dual screen generation process is controlled by the control section 10. Further, whether or not the dual screen control section 51 writes the video data to the DRAM 22, and whether or not the dual screen control section 51 outputs the video data to the OSD processing section 54 are controlled by the control section 10.

The composite video data generated by the dual screen control section 51 is projected on the screen SC as shown in, for example, FIGS. 3A and 3B.

The example shown in FIG. 3A corresponds to a so-called picture-in-picture configuration. In this example, the main video picture V1 based on the main video data is displayed in the display area VA of the screen SC, and the sub-video picture V2 based on the sub-video data is disposed so as to be superimposed on a part of the main video picture V1. The size of the main video picture V1 is the same as roughly the whole of the display area VA, and the size of the sub-video picture V2 is smaller than the size of the main video picture V1.

The example shown in FIG. 3B corresponds to a so-called split screen configuration. In this example, the main video picture V1 and the sub-video picture V2 are arranged side by side in the same size. Since the main video picture V1 and the sub-video picture V2 are both contracted into a smaller size than that of the display area VA while keeping the aspect ratio, black non-display areas having a belt-like shape exist in upper and lower parts of the display area VA.

In the case of combining the video data in the picture-in-picture configuration, the dual screen control section 51 obtains the frame of the sub-video data, and then writes the frame thus obtained to the DRAM 22. The dual screen control section 51 disposes the frame of the sub-video data in the size and at the position designated by the control section 10 to form the frame corresponding to the display area VA. The dual screen control section 51 performs the process of obtaining the frame of the main video data, and the process of obtaining the frame of the sub-video data from the DRAM 22. In these processes, the dual screen control section 51 superimposes the frame of the sub-video data on the frame of the main video data to thereby combine the frames with each other, and thus generates the frame of the composite video data shown in FIG. 3A.

In the case of combining the video data in the split screen configuration, the dual screen control section 51 obtains the frame of the main video data and the frame of the sub-video data, and then writes the frames to the DRAM 22.

In this case, the frames of the main video data and the sub-video data are both contracted, and are written at designated positions in the area for the main video data and the area for the sub-video data in the DRAM 22. In this method, the main video data and the sub-video data are contracted when being written to the DRAM 22, and are combined with each other in the DRAM 22. It is also possible for the frames of the main video data and the sub-video data to be contracted, and then written to the area for the main video data and the area for the sub-video data from the top thereof. The dual screen control section 51 reads out the frame of the main video data and the frame of the sub-frame data once written, and then generates the composite video data added with the non-display areas.

Further, in the process of combining the video data in the split screen configuration, it is also possible to use a method of writing the frame of the main video data and the frame of the sub-video data to the DRAM 22, and then combining the frames with each other when reading out the frames from the DRAM 22. In this case, the dual screen control section 51 does not contract the frame of the main video data output by the main video path 30 or the frame of the sub-video data output by the sub-video path 40, or performs only the contraction on the frames, and then writes the result to the DRAM 22. On this occasion, it is also possible for the dual screen control section 51 to write the frame of the main video data to the area of the DRAM 22 for the main video data from the top thereof, and to similarly write the frame of the sub-video data to the area of the DRAM 22 for the sub-video data from the top thereof. The dual screen control section 51 reads out the frames of the main video data and the sub-video data from the DRAM 22 at the timing in accordance with the size and the arrangement in the case of combining the frames in the split screen configuration, and then combines the frames.

Therefore, in the case of generating the composite video data shown in FIGS. 3A and 3B, the dual screen control section 51 performs writing and reading to and from the DRAM 22.

It should be noted that it is also possible for the main video path 30 to output the main video data to the layer processing section 50, and for the sub-video path 40 to output the sub-video data to the layer processing section 50. Further, it is also possible for the main video path 30 to alternately output the frame of the main video data and the frame of the sub-video data. In this case, it is also possible for the main video path 30 to add identification data, which represents whether the frame of the video data is the main video data or the sub-video data, to the frame of the video data. Further, it is also possible for the dual screen control section 51 to write the frame of the composite video data to the DRAM 22.

The edge blend section 52 performs the edge blend process for adjusting the luminance in the case of performing the projection by placing the plurality of projectors 1A, 1B side by side.

In the present embodiment, there is described an example in which the projection images of the projectors 1A, 1B are arranged side by side in the horizontal direction on the screen SC as shown in FIG. 1. The projection image PL of the projector 1A is located on the left part of the screen SC, and the projection image PR of the projector 1B is located on the right part of the screen SC. In the case in which the projection image PL and the projection image PR form the superimposition part M, since the projection light beams of two projectors, namely the projectors 1A, 1B, are superimposed in the superimposition part M, the luminance in the superimposition part M is adjusted using the edge blend process.

In the edge blend process, the luminance at the position (the pixels) forming the superimposition part M is lowered irrespective of the content of the processing target data. In other words, the edge blend process is a process of reducing the luminance of each pixel in accordance with the position in the frame with respect to the frame of the video picture or the still image as the processing target data, and corresponds to a luminance varying process according to the invention.

The edge blend section 52 of the video processing section 2 provided to the projector 1A lowers the luminance of the right end part of the processing target data VD1 as shown in FIG. 4A. Further, the edge blend section 52 of the video processing section 2 provided to the projector 1B lowers the luminance of the left end part of the processing target data VD2 as shown in FIG. 4B.

In the case of projecting the projection image PL based on the processing target data VD1 and the projection image PR based on the processing target data VD2 so as to form the superimposition part M using the processes shown in FIGS. 4A and 4B, the luminance of the superimposition part M shown in FIG. 4C consorts with the luminance of other parts, and no uncomfortable feeling is caused.

The diagram of FIG. 4D shows a typical example of the edge blend process. The horizontal axis represents the position in the horizontal direction in the screen SC. The vertical axis represents the coefficient of the luminance, and the more the coefficient decreases, the more the degree of attenuating the luminance increases. For example, the coefficient of 1 is the coefficient in the case in which luminance is prevented from being attenuated, and the coefficient of 0 is the coefficient in the case of vanishing the luminance.

As shown in FIG. 4D, the luminance of the processing target data VD1, which is the video data to be processed in the projector 1A, is adjusted so that the closer to the right end the position is, the lower the luminance is in the range corresponding to the superimposition part M. Further, the luminance of the processing target data VD2, which is the video data to be processed in the projector 1B, is adjusted so that the closer to the left end the position is, the lower the luminance is in the range corresponding to the superimposition part M.

In the edge blend section 52, a gradient is disposed to the coefficient of the luminance in the superimposition part M. Therefore, in the superimposition part M, the sum of the luminance of the processing target data VD1 and the luminance of the processing target data VD2 becomes comparable to the luminance of a part other than the superimposition part M, in other words the luminance of each of the processing target data VD1, VD2 on which the luminance adjustment has not been performed.

The configuration of the edge blend process is set in accordance with the number of projectors provided to the projection system 100 and the arrangement state. In other words, a luminance adjustment profile is set to the edge blend section 52 of the projector 1A based on the relative position of the projector 1A in the projection system 100 and ratios of the superimposition part M in length and area to the projection image PL. Further, a luminance adjustment profile is set to the edge blend section 52 of the projector 1B based on the relative position of the projector 1B in the projection system 100 and ratios of the superimposition part M in length and area to the projection image PR. The profile of the edge blend section 52 is set by the control section 10 in accordance with, for example, the control data output by the video supply device 3 separately from the video data.

The above is an example of the case in which the projection system 100 is provided with the two projectors 1A, 1B. For example, in the case of disposing three projectors side by side in the horizontal direction to superimpose the projection images of the respective projectors on each other, the projector located at the center decreases the luminance in the both side end portions of the projection image using the edge blend process. Further, in the case of disposing the projectors side by side in the vertical direction (the perpendicular direction), the luminance in both or either of the upper end portion and the lower end portion is decreased using the edge blend process.

The OSD processing section 54 performs the OSD process for superimposing the OSD (on-screen display) image on the composite video data or the video data input thereto.

The OSD image is a menu screen for performing an operation and setting of the projectors 1A, 1B or the like as shown in, for example, FIG. 3C. In the example shown in FIG. 3C, a menu OSD image V3 for performing an operation and setting is disposed at the center of the display area VA. In the state in which the image data of the menu OSD image V3 is written to the DRAM 22, the OSD processing section 54 reads out the data of the menu OSD image V3, then alpha-blends the data of the menu OSD image V3 into the processing target data, and then outputs the result. The menu OSD image V3 corresponds to a display object for the menu screen. The process of the OSD processing section 54 for superimposing the menu OSD image on the processing target data corresponds to the menu OSD process.

Further, it is also possible for the OSD processing section 54 to superimpose the image drawn based on the operation of the pointing object 5 as the OSD image. For example, as shown in FIG. 3D, in the case in which the data of drawn image V4 obtained by drawing a character in accordance with the operation of the pointing object 5 having a pen-like shape has been written to the DRAM 22, the OSD processing section 54 superimposes the data of the drawn image V4 on the processing target data. The OSD processing section 54 reads out the image having been written to an area for storing the OSD image in the DRAM 22, then alpha-blends the data of the OSD image into the processing target data, and then outputs the result irrespective of the content of the OSD image. The drawn image corresponds to the display object including an image. The process of the OSD processing section for superimposing the drawn image corresponds to an image OSD process.

As described above, the OSD processing section performs at least two types of OSD processes, namely the menu OSD process for superimposing the display object for the menu screen on the processing target data, and the image OSD process for superimposing the display object including an image such as the drawn image. The display object for the menu screen can be referred to as a first-type image, the menu OSD process as a first-type OSD process, and the display object including an image such as the drawn image as a second-type image, and the image OSD process as a second-type OSD process.

The process of writing the OSD image to the DRAM 22 is performed by the control section 10. The control section 10 reads out the data of the OSD image stored in advance in the ROM 10*b* or a storage section not shown, and then writes the data to the DRAM 22 in accordance with the operation of the operation section 18. The data of the OSD image superimposed by the OSD processing section 54 can be provided with a smaller number of colors than the number of colors (the number of grayscale levels), which the video processing section 2 can display, using an index (pallet) format.

Further, in the case in which the drawing device 7 (drawing section) inputs the coordinate data, it is possible for the control section 10 to draw an image based on the coordinate data, and then write the image data thus drawn to the DRAM 22. For example, the control section 10 draws a geometric figure having the position pointed by the pointing object 5 as a vertex, and an image of a straight line or a curved line along a trajectory of the pointed position by the pointing object 5. The image data, which the control section 10 has drawn and then written to the DRAM 22, is stored by the DRAM 22 as the data of the OSD image.

Here, it is also possible to adopt a configuration in which the drawing device 7 is provided with the drawing function of performing drawing based on the position pointed by the pointing object 5. For example, it is also possible for the drawing device 7 to function as the drawing section, draw a geometric figure or a straight line or a curved line along the trajectory of the pointed position, and output the image data of the image thus drawn to the projectors 1A, 1B. The image data in this case can be vector image data or scalar image data, and it is sufficient for the control section 10 to make the video processing section 2 perform the OSD process on the image data output by the drawing device 7.

Further, as described above, it is possible to adopt a configuration in which the control section 10 of each of the projectors 1A, 1B is provided with the drawing function. In this case, the control section 10 of each of the projectors 1A, 1B provided with the drawing function corresponds to the drawing section.

Alternatively, it is also possible to adopt a configuration in which the projectors 1A, 1B are each provided with a drawing section, which performs drawing based on the coordinate data input from the drawing device 7, separately from the control section 10. In this case, it is sufficient for the control section 10 to make the video processing section 2 perform the OSD process on the image drawn by the drawing section.

In the case of driving the liquid crystal light valves of the modulation section 14 at double speed or quad speed, the rate conversion section 26 performs the conversion of the frame rate of the video data output by the layer processing section 50. For example, in the case in which the frame rate of the video data input to the video processing section 2 is 60 fps, and the liquid crystal light valves are driven at quad speed, the rate conversion section 26 outputs the video data with the frame rate of 240 fps to a panel correction section 27. Therefore, the rate conversion section 26 writes the frame output by the layer processing section 50 to the DRAM 22, and then reads out the frame in sync with the frame rate thus converted to output the frame to the panel correction section 27. Even in the case in which the modulation section 14 is not provided with the liquid crystal light valves, it is also possible to perform the frame rate conversion using the rate conversion section 26.

The panel correction section 27 corrects the video data in accordance with the voltage-transmittance characteristics (VT characteristics) of the liquid crystal light valves provided to the modulation section 14, and the state of the color variation specific to the individual of the liquid crystal light valves. The panel correction section 27 performs the correction using, for example, a gamma correction LUT (lookup table) or a color variation correction LUT. The panel correction section 27 outputs the video signal for displaying the data of the frame having been corrected to the display drive section 17 (FIG. 1) of the image forming section 12.

The video processing section 2 is provided with a block transmission section 28 (transmission section). The block transmission section 28 is connected to the DRAM controller 23, and is capable of reading out the data of the frame stored in the DRAM 22, and inputs the data thus read out to the video input section 31. The block transmission section 28 is capable of generating a video frame control signal such as a vertical sync signal (VSYNC) and a horizontal sync signal (HSYNC) in accordance with the data of the frame, and then input the video frame control signal into the video input section 31 synchronizing the timing with the data of the frame.

Further, in the case in which the image data has been input from the input processing section 21 or the control section 10, it is possible for the block transmission section 28 to transmit the image data to the DRAM 22 to write the image data to the DRAM 22.

As described above, the layer processing section 50 performs a dual screen combining process by the dual screen control section 51, the edge blend process by the edge blend section 52, and the OSD process by the OSD processing section 54. The sequence of these processes will be described.

Figure 5A:
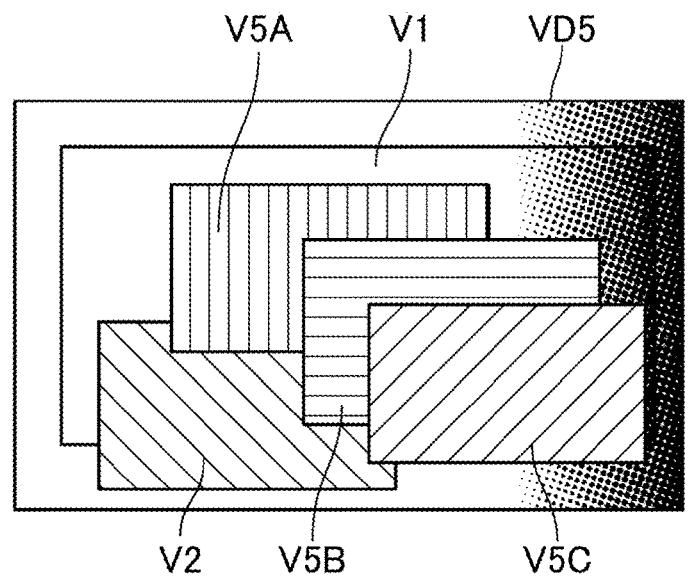
FIGS. 5A and 5B are explanatory diagrams of functions of the projector.
Figure 5B:
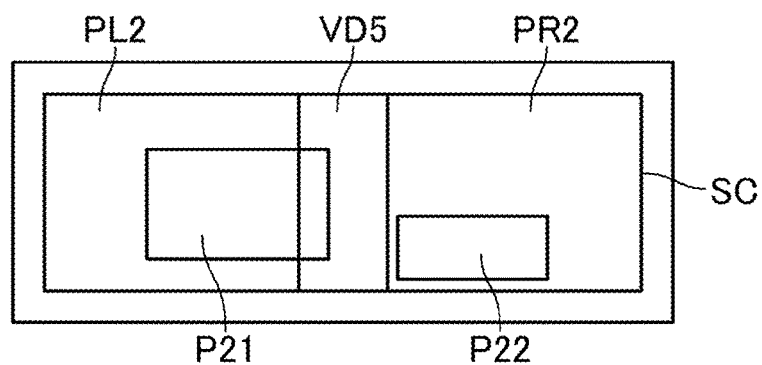
Figure 6A:
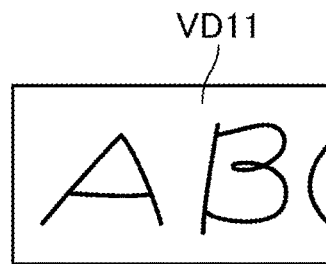
FIGS. 6A through 6E are explanatory diagrams of functions of the projector.
Figure 6B:
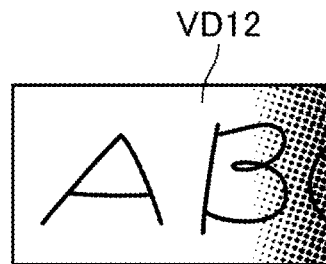
Figure 6C:
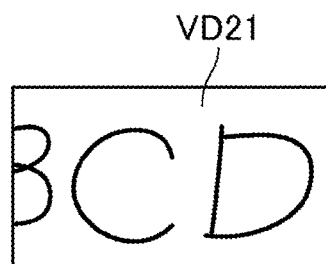
Figure 6D:
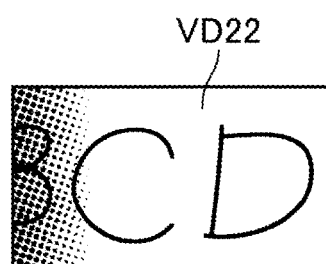
Figure 6E:
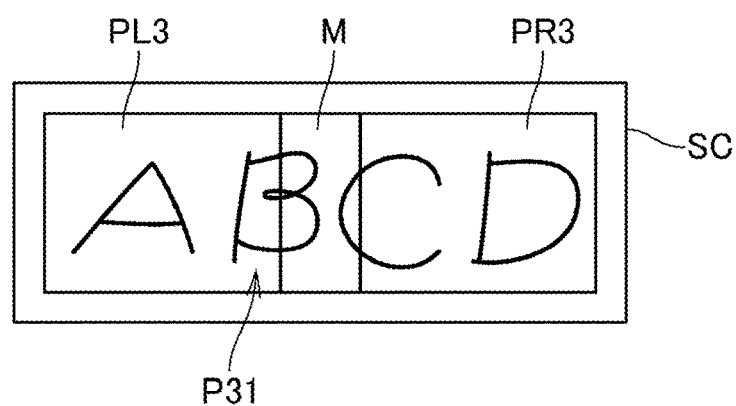

FIGS. 5A, 5B, 6A through 6E, and 7 are diagrams showing the functions of the projector, wherein FIG. 5A schematically shows the process of the layer processing section 50, and FIG. 5B shows a combination of the edge blend process and the OSD process. FIG. 6A shows the processing target data VD11, in which the OSD process has been performed on the drawn image, and FIG. 6B shows the processing target data VD12 obtained by performing the edge blend process on the processing target data VD11. FIG. 6C shows the processing target data VD21, in which the OSD process has been performed on the drawn image, and FIG. 6D shows the processing target data VD22 obtained by performing the edge blend process on the processing target data VD21. FIG. 6E shows the projection image in the case in which the processing target data VD12 and the processing target data VD22 are projected by the projection system 100.

FIG. 5A shows an example in which the layer processing section 50 performs all of the executable processes, the processing target data VD5 includes the main video picture V1, and it is possible to perform the edge blend process on the processing target data VD5 to thereby decrease the luminance in the left end portion in the drawing. Further, the sub-video picture V2 can be combined with the processing target data VD5, and further OSD images V5A, V5B, and V5C can be superimposed on the processing target data VD5. The OSD images V5A, V5B, and V5C can also be menu images, or can also be images drawn based on the pointed position by the pointing object 5.

The process performed by the layer processing section 50 often affects the entire frame of the processing target. The edge blend process is a process for decreasing the luminance of the end portion in the frame. However, since the edge blend section 52 applies the coefficient determined for each position with respect to the entire frame, the edge blend process can be said to be a process to the entire frame. In the dual screen combining process, the sub-video picture is superimposed on an arbitrary position of the main video picture in the case of adopting the picture-in-picture configuration, and in the split screen configuration, there is generated a new frame including the main video picture, the sub-video picture, and a background having a black belt shape. Since the size and the position of the OSD image are arbitrary also in the OSD process, the entire frame is affected.

Therefore, the sequence of the processes in the layer processing section 50 significantly affects the configuration of the video data, on which the processes are performed, output by the layer processing section 50.

FIG. 5B shows an example of displaying the OSD images P21, P22 of the menu. In this example, the projector 1A displays the OSD image P21 of the menu for performing setting of the projector 1A, the projector 1B displays the OSD image P22 of the menu related to setting of the projector 1B. Therefore, the OSD image P21 is located in the projection image PL2 of the projector 1A, and the OSD image P22 is located in the projection image PR2 of the projector 1B. Further, apart of the OSD image P21 is located in the superimposition part M. In this example, when performing the edge blend process after the OSD processing section 54 superimposes the OSD image P21, the luminance of the part of the OSD image P21 superimposed on the superimposition part M decreases. However, the OSD image P21 does not exist in the projection image PR2. Therefore, the OSD image P21 incurs the result that the luminance unnaturally decreases in the superimposition part M.

Therefore, in the case in which the layer processing section 50 performs the OSD process and the edge blend process of the menu image, it is desirable to perform the edge blend process first, and then perform the OSD process of the menu image. Further, it is desirable that the position, where the OSD image displayed by only either one of the projectors such as the menu image is superimposed, is set to the position separated from the superimposition part M as in the case of the OSD image P22 instead of the position overlapping the superimposition part M as in the case of the OSD image P21 shown in FIG. 5B.

Further, in the case of performing the OSD process of the drawn image and the edge blend process using the layer processing section 50, it is preferable to perform the OSD process first, and then perform the edge blend process.

The drawn image is drawn in accordance with the operation of the pointing object 5. It is possible for the user operating the pointing object 5 to operate the pointing object 5 without regard to the boundaries between the projection image of the projector 1A, the superimposition part M, and the projection image of the projector 1B. Therefore, there is a good chance that the drawn image strides both of the projection images of the projectors 1A, 1B.

In this case, in the projector 1A, the OSD process of superimposing the drawn image on the processing target data is performed. FIG. 6A shows the processing target data VD11 on which the OSD process has been performed. The edge blend process is performed on the processing target data VD11 on which the OSD process has been performed. The processing target data VD12 shown in FIG. 6B is the data obtained by performing the edge blend process on the processing target data VD11, and the luminance is changed to be lower with respect to the pixels in the right end portion of the frame corresponding to the superimposition part M.

Further, in the projector 1B, the OSD process of superimposing the drawn image on the processing target data is performed in a similar manner. FIG. 6C shows the processing target data VD21 on which the OSD process has been performed. The edge blend process is performed on the processing target data VD21 on which the OSD process has been performed. The processing target data VD22 shown in FIG. 6D is the data obtained by performing the edge blend process on the processing target data VD21, and the luminance is changed to be lower with respect to the pixels in the left end portion of the frame corresponding to the superimposition part M.

Further, in the case in which the projector 1A projects the processing target data VD12, and the projector 1B projects the processing target data VD22, the projection image on the screen SC becomes the state shown in FIG. 6E. The drawn image located in the superimposition part M is included in both of the processing target data VD12 and the processing target data VD22, and the edge blend process has been performed on the drawn image. Therefore, the drawn image is projected in the superimposition part M with an appropriate luminance. In this example, the sequence of performing the edge blend process after performing the OSD process is appropriate. Further, in the case in which the drawn image is located at a position separated from the superimposition part M, since the drawn image is not affected by the edge blend process, there is no need to change the sequence of performing the edge blend operation after the OSD process.

As described above, in the case of performing both of the OSD process and the edge blend process, it is preferable for the layer processing section 50 to reverse the order of the processes in accordance with the type or the purpose of the image to be superimposed in the OSD process. Further, as described above, it is possible to treat the menu OSD process (the first-type OSD process) of the OSD processing section 54 and the image OSD process (the second-type OSD process) as the processes different from each other. In this case, the OSD processing section 54 corresponds to a plural process execution section capable of performing a plurality of processes. It is also possible for the selector 56 to control execution/non-execution with respect to each of the two processes to be executed by the OSD processing section 54, and to control the execution sequence with respect to each of the two processes.

In the case in which the layer processing section 50 performs both of the dual screen combining process and the OSD process of the menu image, it is preferable to arrange that the menu image can be superimposed also on the background part having the black belt shape in the case of performing the dual screen combining process with the split screen configuration. Further, also in the case of performing the dual screen combining process with the picture-in-picture configuration, it is preferable to arrange that the menu image can be superimposed irrespective of the position of the sub-video picture. Therefore, as the execution sequence in the case of performing both of the dual screen combining process and the OSD process of the menu image, performing the dual screen combining process first, and then performing the OSD process of the menu image is preferable.

Further, in the case in which the layer processing section 50 performs both of the dual screen combining process and the OSD process of the drawn image, it is preferable to arrange that the operation of the pointing object 5 is possible regardless of the range of each of the projection images of the projectors 1A, 1B. Therefore, as the execution sequence in the case of performing both of the dual screen combining process and the OSD process of the drawn image, the sequence of performing the dual screen combining process first, and then performing the OSD process of the drawn image is preferable.

It should be noted that in the projection system 100, there is a need to store the result of drawing in accordance with the operation of the pointing object 5. The data of the video pictures output by the video supply device 3 to the projectors 1A, 1B can be stored in the video supply device 3, or can be recorded. However, storing the data of the image drawn based on the operation of the pointing object 5 can only be achieved by a method in which the drawing device 7 stores the data when the drawing device 7 performs drawing and then outputs the data of the drawn image to the projectors 1A, 1B. Further, a method of storing the result of the superimposition of the image in the projectors 1A, 1B does not exist. In this case, there can be used a method of storing the data of the video picture to be projected by writing the data to the DRAM 22 using the function of the dual screen control section 51 performing writing to the DRAM 22 in the case of performing both of the dual screen combining process and the OSD process of the drawn image. Specifically, the OSD process is performed first, then the dual screen combining process is performed, and then the processing target data after the dual screen combining process is written to the DRAM 22. The data written to the DRAM 22 can be output to the control section 10 or the interface section 11 due to the function of the block transmission section 28.

In the case in which the layer processing section 50 performs both of the dual screen combining process and the OSD process of the drawn image, and the edge blend process is further performed, it is possible to perform the edge blend process in the video supply device 3. Specifically, the video data on which the dual screen combining process and the OSD process of the drawn image have been performed is written to the DRAM 22, and the video data written to the DRAM 22 is output from the projectors 1A, 1B to the video supply device 3. Then, the edge blend process is performed in the video supply device 3, and then the video data on which the edge blend process has been performed is output to the projectors 1A, 1B as, for example, the data D1, D3 of the main video picture. In this case, the function of the input processing section 21 performing writing to the DRAM 22 can effectively be used. Further, by performing the edge blend process in the video supply device 3, it is also expected to perform more accurate adjustment of the luminance. Further, in the case of not performing the adjustment of the luminance in the edge blend process, it is sufficient to perform the processes in the order of the OSD process, the edge blend process, and the dual screen combining process.

Figure 7:
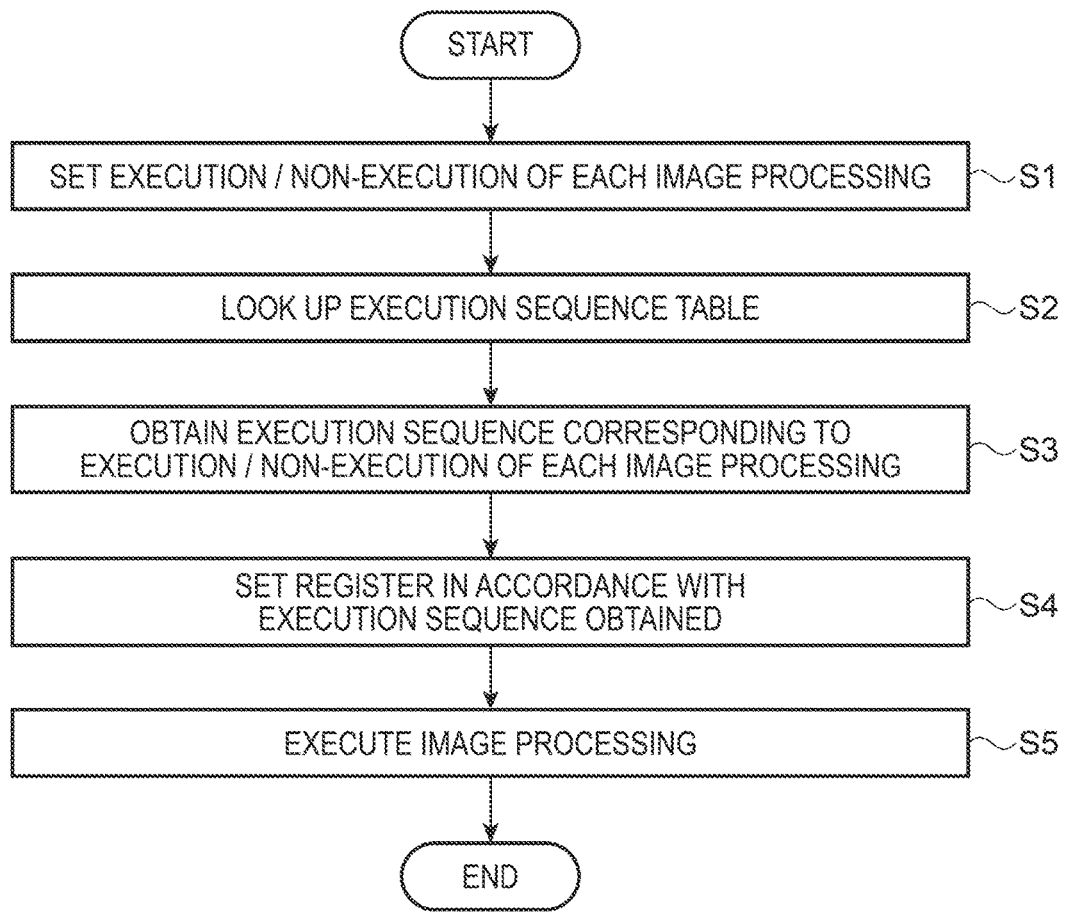
FIG. 7 is a flowchart showing an operation of the projector.

FIG. 7 is a flowchart showing an operation of the projectors 1A, 1B, and shows the operation of the control section 10 controlling the execution of the process in the layer processing section 50. The operation shown in FIG. 7 is executed by the control section 10 in each of the projectors 1A, 1B.

The control section 10 performs determination of the data input from the video supply device 3 and the drawing device 7 connected to the interface section 11, communication of the control data with the video supply device 3, and communication of the control data with the drawing device 7 to identify the input state of the data and the configuration of the data. Then, the control section 10 identifies (step S1) the operation settings with respect to each image processing which can be executed by the layer processing section 50. The operation setting of the image processing is specifically a setting for determining whether each image processing is executed or not executed (non-execution).

The control section 10 looks up (step S2) an execution sequence table for determining the execution sequence of the processes in the layer processing section 50 to obtain (step S3) the execution sequence defined by the execution sequence table in accordance with the execution state of each image processing identified in the step S1.

FIG. 8 is a diagram showing a configuration example of the execution sequence table.

In the example shown in FIG. 8, the execution sequence is defined in association with the execution states of the edge blend process, the OSD process of a menu image, and the OSD process of a drawn image. Besides the example shown in FIG. 8, it can also be adopted a table for defining the execution sequence in conjunction with the execution states of the four processes including the dual screen combining process.

The control section 10 performs (step S4) setting to the register 55 of the layer processing section 50 in accordance with the execution sequence obtained in the step S3. Specifically, the setting values regarding whether or not the respective processing sections of the dual screen control section 51, the edge blend section 52, and the OSD processing section 54 perform the processes, and the setting value representing the execution sequence are written to the register 55. Subsequently, the control section 10 makes the video processing section 2 perform (step S5) the process on the data input to the input processing section 21.

FIGS. 9 through 12 are flowcharts showing the operation of the projectors 1A, 1B, and show the operation of the video processing section 2.

Figure 9:
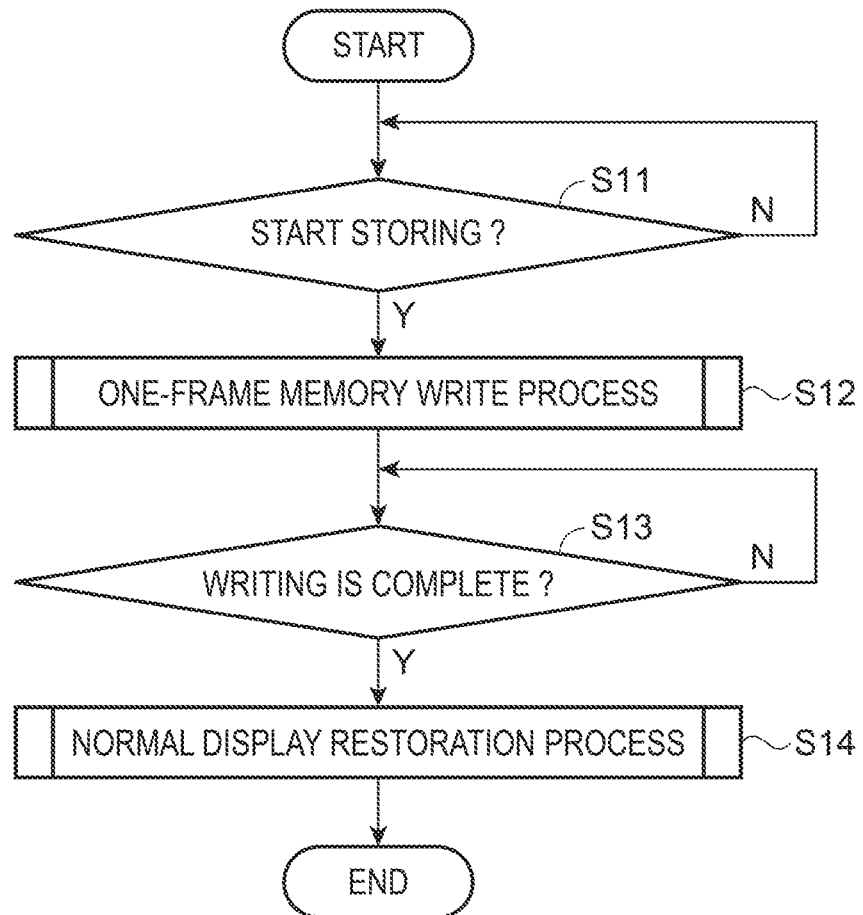
FIG. 9 is a flowchart showing an operation of the projector.

The operation shown in FIG. 9 shows an operation of storing the result of drawing performed in accordance with the operation of the pointing object 5. Specifically, there is shown an operation of storing the data of the video picture to be projected by writing the data to the DRAM 22 using the function of the dual screen control section 51 performing writing to the DRAM 22 in the case of performing the OSD process of the drawn image.

When storing is instructed by the operation of the user, the control section 10 controls each section of the video processing section 2 to start (step S12) a storing function.

The control section 10 executes (step S12) a one-frame memory write process. The one-frame memory write process in the step S12 is a process of writing the data of one frame to the DRAM 22.

Figure 10:
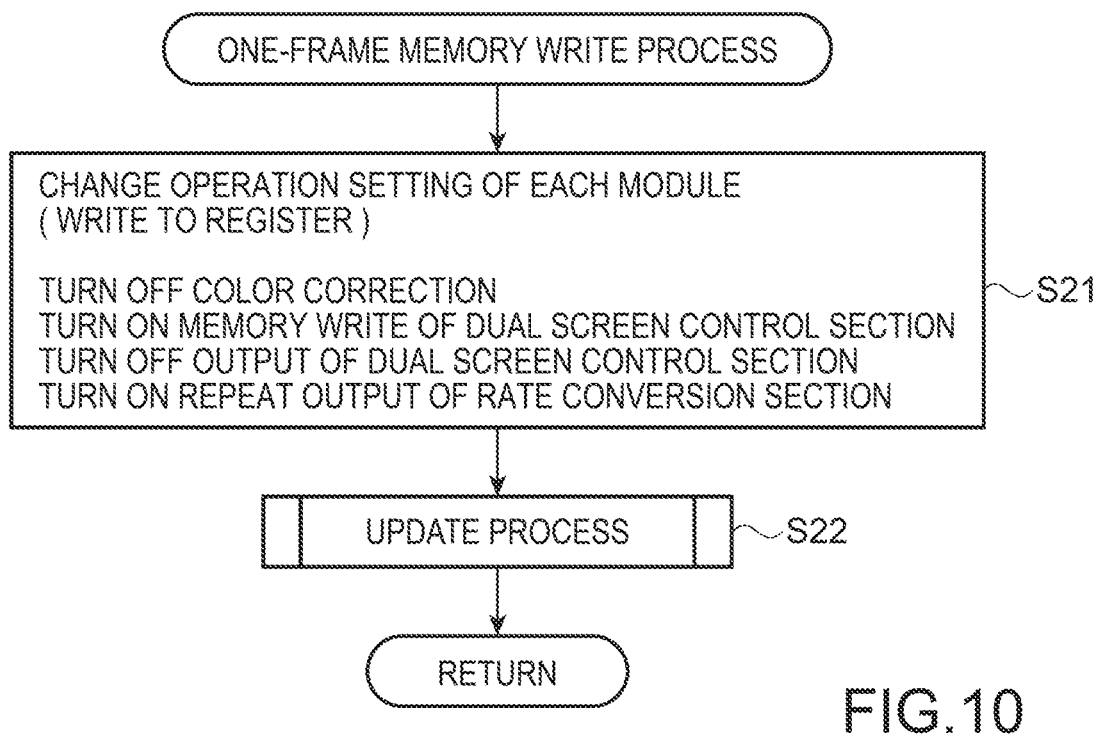
FIG. 10 is a flowchart showing an operation of the projector.

FIG. 10 shows the one-frame memory write process.

The control section 10 changes (step S21) the operation settings of the processing section of the video processing section 2. The video processing section 2 is provided with a register (not shown) for storing the settings of the operations of the respective processing sections of the rate conversion section 26, the main video path 30, and the sub-video path 40 in addition to the register 55. The control section 10 rewrites the setting values of the respective registers to thereby change the operation settings. In the step S21, the color correction process of the color correction sections 33, 43 is set to the OFF state. This is for storing the data in the condition in which any other process than the combination with the drawn image is hardly performed. Further, in the step S21, the control section 10 sets the writing by the dual screen control section 51 to the DRAM 22 to the ON state, and sets the data output from the dual screen control section 51 to any other devices than the DRAM 22 to the OFF state. Further, the control section 10 sets the operation (repeat output) of the rate conversion section 26 repeating reading of the data of the frame from the DRAM 22 to output the data to the panel correction section 27 to the ON state.

Thus, it becomes possible for the dual screen control section 51 to write the data of one frame to the DRAM 22. Further, since the dual screen control section 51 does not output to any other processing sections than the DRAM 22, and the rate conversion section 26 becomes to stop writing to the DRAM 22, the data of the DRAM 22 is prevented from being unintentionally updated.

Subsequently, the control section 10 performs (step S22) an update process.

Figure 11:
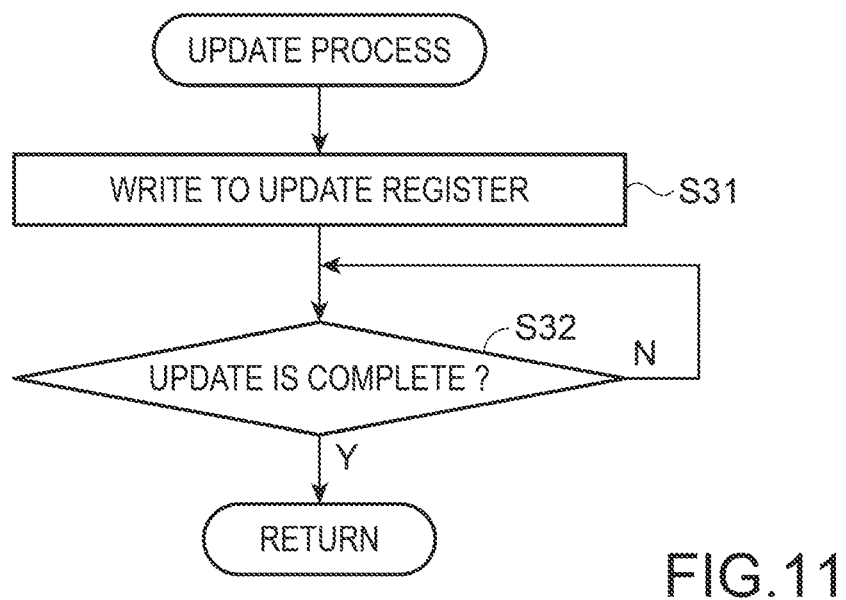
FIG. 11 is a flowchart showing an operation of the projector.

FIG. 11 is a flowchart showing the update process. The update process is an operation for reflecting a change in the settings of the sections of the video processing section 2 in the case in which the control section 10 has made the change. Specifically, the control section 10 updates (step S31) a value of an update register (not shown) provided to the video processing section 2, waits (NO in step S32) until the completion of the update, and then terminates (YES in step S32) the process when the update is complete. The update register provided to the video processing section 2 is a register for holding a value representing presence or absence of update of the settings.

When the one-frame memory write process shown in FIG. 9 is complete, and the value of the update register is updated, the operations of the respective sections of the video processing section 2 are switched in sync with the vertical sync signal VSYNC, and the video picture input to the input processing section 21 is written to the DRAM 22 as much as one frame.

Specifically, the control section 10 rewrites the value of the update register to 1 in the step S31 with respect to the processing section having been changed in the setting. The processing section the update register of which is rewritten to 1 switches the operation in sync with the subsequent vertical sync signal VSYNC, and the value of the update register is rewritten to 0 due to the switching of the operation. Therefore, the control section 10 can detect the fact that the operation of the processing section has been switched with reference to the value of the update register in the step S32.

The control section 10 waits (NO in step S13) until writing to the DRAM 22 is complete, and when the writing by the dual screen control section 51 is complete (YES in step S13), the control section 10 performs (step S14) a normal display restoration process.

Figure 12:
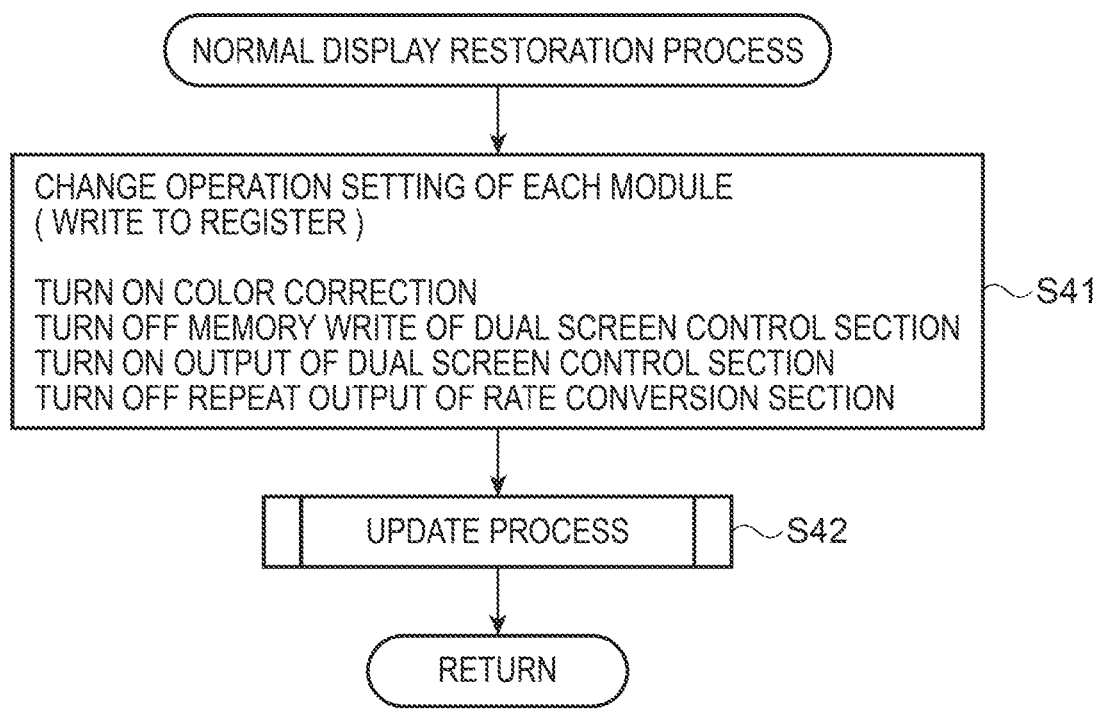
FIG. 12 is a flowchart showing an operation of the projector.

FIG. 12 is a flowchart showing the normal display restoration process.

The control section 10 rewrites the value of the register with respect to the operation setting of the processing section of the video processing section 2 to change (step S41) the setting. Specifically, the control section 10 changes the setting so that the input of the block transmission section 28 is switched to the input processing section 21 side.

The control section 10 performs the setting of the register in the step S41, and then performs (step S42) the update process to reflect the settings. The update process is as shown in FIG. 11.

Thus, it is possible to process the main video data, which is output by the input processing section 21 to the main video path 30, using the main video path 30, and then output the result to the panel correction section 27 via the processes of the layer processing section 50 and the rate conversion section 26.

The operation of the video processing section 2 shown in FIGS. 9 through 12 will be described using the flow of the data between the processing sections.

Figure 13:
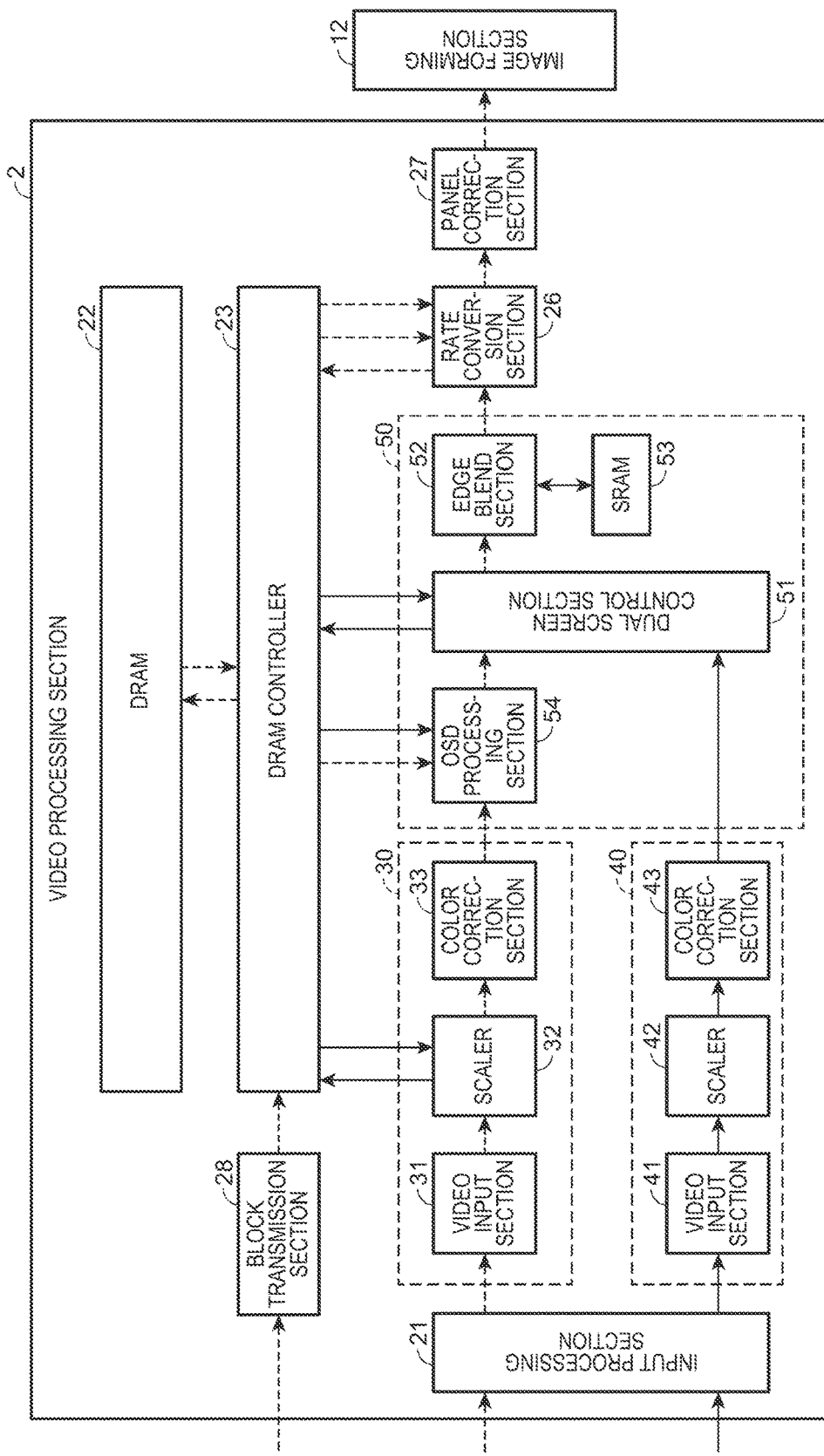
FIG. 13 is an explanatory diagram of an operation of the video processing section.
Figure 14:
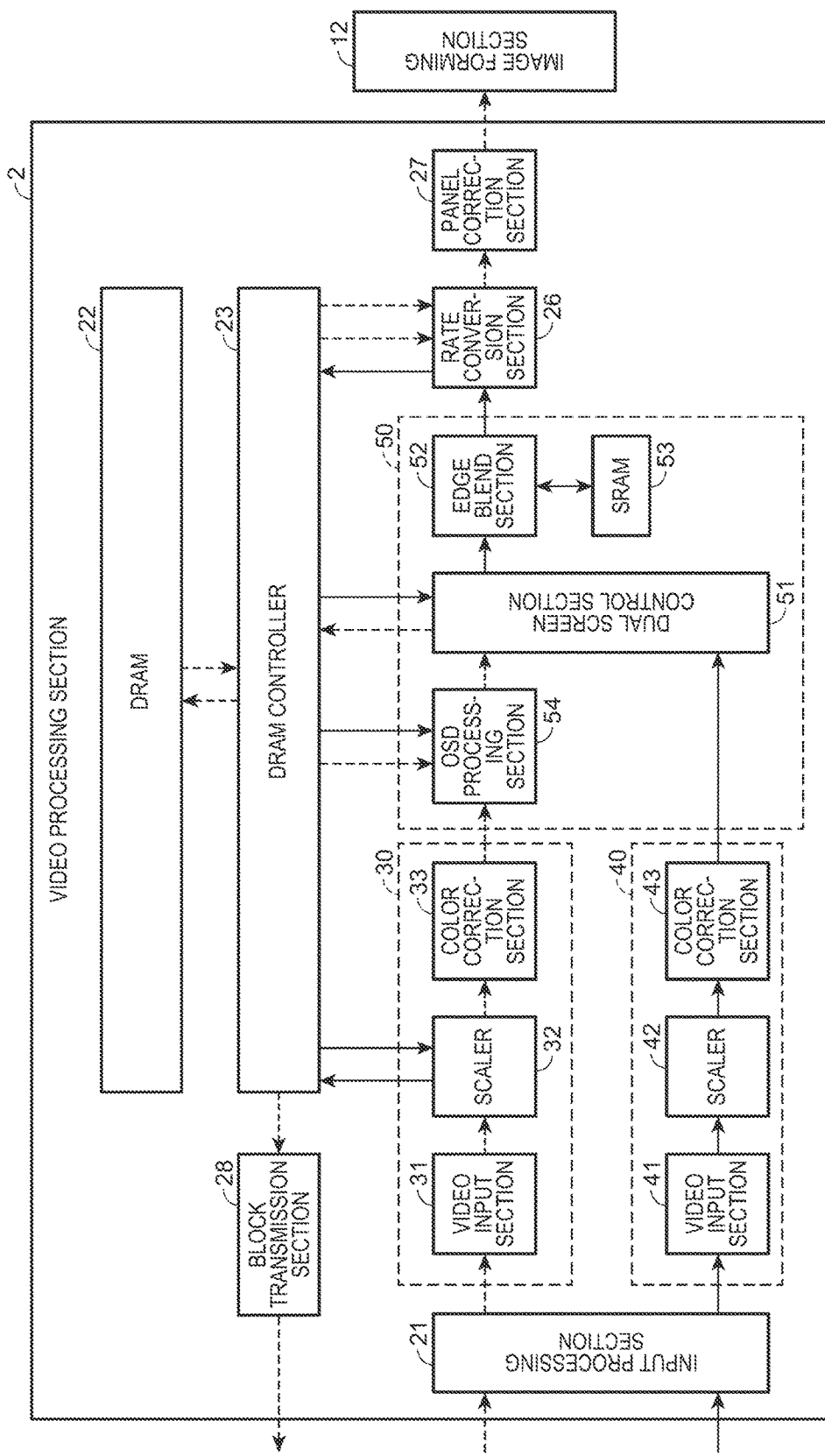
FIG. 14 is an explanatory diagram of an operation of the video processing section.

FIGS. 13 and 14 are explanatory diagrams showing the operation of the video processing section 2, wherein FIG. 13 shows the operation of the normal display, and FIG. 14 shows the one-frame memory write process. In FIGS. 13 and 14, the path through which the video data is actually output is indicated by dotted lines.

In the case of performing the normal display, namely the case in which the operation mode of the video processing section 2 is the normal display mode, the input processing section 21 outputs the main video data to the video input section 31, and then the video input section 31 outputs the main video data to the scaler 32. The scaler 32 performs the resolution conversion process, and then outputs the main video data to the color correction section 33. Then, the color correction section 33 performs the color correction process and the generation of the intermediate frame, and then outputs the main video data having been processed to the dual screen control section 51.

Since the sub-video data is not input in this example, the main video path 30 outputs the main video data, which has been output by the color correction section 33, to the layer processing section 50. In this example, there is shown the case in which the layer processing section 50 performs the processes in the order of the OSD process, the dual screen combining process, and the edge blend process. In other words, the layer processing section 50 is equivalent to the state in which the OSD processing section 54, the dual screen control section 51, and the edge blend section 52 are connected to each other in this order.

Further, in FIGS. 13 and 14, the layout of the processing sections (the dual screen control section 51, the edge blend section 52, and the OSD processing section 54) provided to the layer processing section 50 is different. However, this difference in the layout does not mean that some kind of modification is made in the hardware configuration.

The OSD processing section 54 reads out the OSD image data from the DRAM 22 to superimpose on the main video data, and then outputs the video data, on which the OSD image has been superimposed, to the dual screen control section 51. The dual screen control section 51 does not perform the dual screen combining process since the sub-video picture is not input, and then outputs the video data, which has been output by the OSD processing section 54, to the edge blend section 52. Then, the edge blend section 52 performs the edge blend process as needed.

The edge blend section 52 outputs the video data having been processed to the rate conversion section 26, and the rate conversion section 26 writes the video data to the DRAM 22, and then reads out the video data at a predetermined frame rate to output to the panel correction section 27.

In the one-frame memory write process shown in FIG. 14, the input processing section 21 outputs the video data to the video input section 31, and the video data is input to the layer processing section 50 via the main video path 30. In the layer processing section 50, in order to store the image having been drawn, there is set the sequence of performing the OSD process and then performing the dual screen combining process as described above. In other words, the layer processing section 50 is equivalent to the state in which the OSD processing section 54, the dual screen control section 51, and the edge blend section 52 are connected to each other in this order as shown in FIG. 14.

The OSD processing section 54 performs the OSD process for superimposing the data of the drawn image on the video data output by the main video path 30, and then outputs the video data having been processed to the dual screen control section 51. The dual screen control section 51 performs the dual screen combining process on the video data having been processed by the OSD processing section 54 in the case in which the input of the sub-video data exists. Further, in the case in which the input of the sub-video data is absent, the dual screen control section 51 does not perform the dual screen combining process. In either of the cases, the dual screen control section 51 writes the frame of the video data to the DRAM 22 on the one hand, and does not perform the output to the edge blend section 52 on the other hand.

Therefore, although the video data is not output from the layer processing section 50 to the rate conversion section 26, the rate conversion section 26 reads out the video data having been written to the DRAM 22 at a predetermined frame rate, and then outputs the video data to the panel correction section 27. Therefore, it becomes possible to continue the projection toward the screen SC.

As described hereinabove, the video processing section 2 according to the embodiment to which the invention is applied is configured so as to be able to perform a plurality of types of image processing on the processing target data using the layer processing section 50 in the case in which the still image data or the data of the frame constituting the video data is input as the processing target data. The video processing section 2 is provided with the selector 56 for controlling the execution sequence of the plurality of types of image processing, and the panel correction section 27 for outputting the processing target data having been processed in the execution sequence controlled by the selector 56. By making use of the selector 56, it is possible to change, for example, the execution sequence of the plurality of types of image processing. Therefore, it is possible to control execution and non-execution of each of the types of image processing on the processing target data, and the execution sequence of the image processing. Therefore, in the case of performing the plurality of processes on the image or the video picture as the processing target, the processes can efficiently be performed in an appropriate execution sequence.

Further, the video processing section 2 performs the process setting the whole of the processing target data as the processing target using at least either of the types of image processing. For example, the video processing section 2 performs the process to the entire frame with the dual screen combining process, the OSD process, and the edge blend process. Therefore, in the case in which the execution sequence of the image processing significantly affects the result passing through the plurality of types of image processing, the plurality of types of image processing can be performed in an appropriate execution sequence.

Further, it is possible for the video processing section to control execution and non-execution with respect to each of the types of image processing using the selector 56. Therefore, it is possible to selectively perform the process compatible with the processing target data, and thus, the processing target data can effectively be processed.

Further, in the video processing section 2, the execution sequence of the image processing is set in advance in accordance with the combination of execution and non-execution of each of the types of image processing using the execution sequence table. Therefore, the execution sequence can promptly be determined based on the necessity of the execution of each of the types of image processing. Further, the burden of the process for determining the execution sequence can be reduced.

In the video processing section 2, the image processing performed by the layer processing section 50 includes a process of superimposing another image on the image based on the processing target data. Specifically, there is included the process of superimposing the OSD image using the OSD processing section 54.

Further, in the video processing section 2, the image processing performed by the layer processing section 50 includes a process of varying the luminance of the image, which is based on the processing target data, in accordance with an in-plane luminance distribution set in advance. Specifically, the edge blend section 52 performs the edge blend process for adjusting the luminance based on the coefficient of the luminance distribution set in advance on the entire frame.

In such a manner, the layer processing section 50 can perform the plurality of types of image processing in the appropriate execution sequence in the case in which the influence of the execution sequence of the image processing is significant.

Further, the layer processing section 50 is provided with the plural process execution section for performing the plurality of types of image processing such as the OSD processing section 54. It is possible for the selector 56 to control execution and non-execution with respect to each of the types of image processing to be performed by the plural process execution section. Therefore, the degree of freedom of the circuit configuration is enhanced, and it is possible to achieve higher efficiency.

In the embodiment described above, there is adopted the configuration in which the video supply device 3 can output the main video data D1, D3 and the sub-video data D2, D4 to each of the projectors 1A, 1B. In this configuration, in the case of performing the dual screen combining process and the edge blend process in the layer processing section 50, the sequence of performing the dual screen combining process first, and then performing the edge blend process is appropriate.

More specifically, it is possible to perform a plurality of types of image processing, which include the edge blend process as the luminance varying process for varying the luminance in accordance with the position in the plane (in the frame), and the menu OSD process for superimposing a display object for the menu screen on the processing target data, on the processing target data. The execution sequence in this case is controlled to be a sequence in which the edge blend process is performed prior to the menu OSD process. Thus, since the menu OSD image is not affected by the edge blend process, the visibility of the menu OSD image can be kept in a high level.

Further, it is possible to perform the plurality of types of image processing, which include the edge blend process and the image OSD process for superimposing a drawn image, on the processing target data. The execution sequence in this case is controlled to be a sequence in which the image OSD process is performed prior to the edge blend process. Thus, since the edge blend process can be reflected on the drawn image similarly to the other parts of the processing target data, the drawn image is displayed in the state without a feeling of strangeness.

Further, in the projection system 100, it is also possible for the video supply device 3 to perform the control of multiple projection, divide and extract the data of the entire image to be projected by the two projectors 1A, 1B to thereby generate the video data to be output to the respective projectors 1A, 1B. In this case, the data including a partial video picture corresponding to the range in which the projection image is projected is input to each of the projectors 1A, 1B.

Figure 15A:
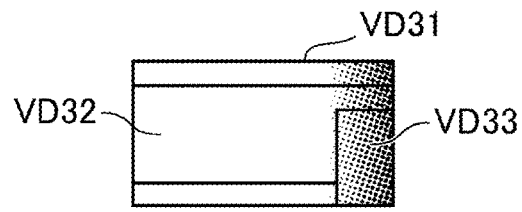
FIGS. 15A through 15F are explanatory diagrams of functions of the projector.
Figure 15B:
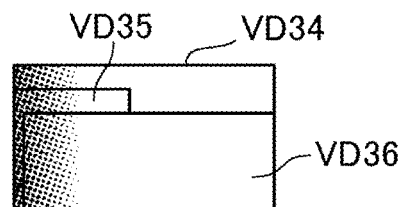
Figure 15C:
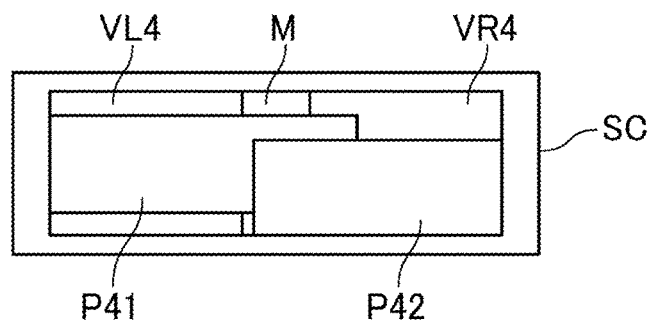
Figure 15D:
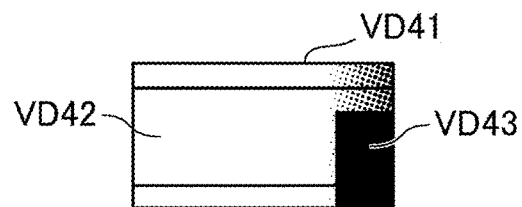
Figure 15E:
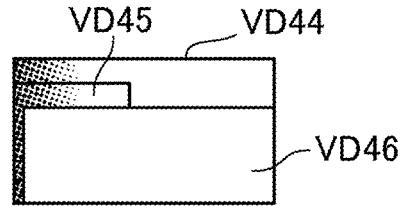
Figure 15F:
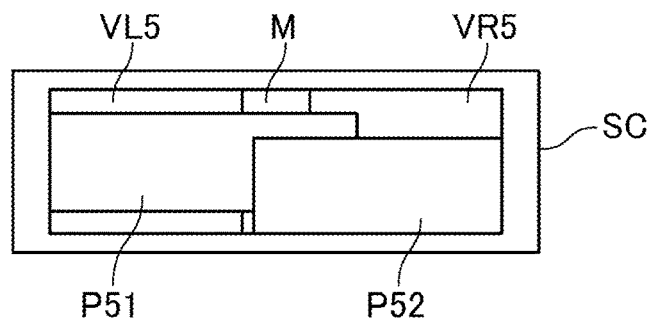

FIGS. 15A through 15F are diagrams schematically showing the operation of the projectors 1A, 1B, wherein FIG. 15A shows the processing target data VD31 on which the dual screen combining process and the edge blend process have been performed in the projector 1A. FIG. 15B shows the processing target data VD34, on which the dual screen combining process and the edge blend process have been performed in the projector 1B, and FIG. 15C shows the state in which the processing target data VD31, VD34 are projected. FIG. 15D shows the processing target data VD41, on which the dual screen combining process and the edge blend process have been performed in the projector 1A, and FIG. 15E shows the processing target data VD44, on which the dual screen combining process and the edge blend process have been performed in the projector 1B. FIG. 15F shows the state in which the processing target data VD41, VD 44 are projected.

The video supply device 3 has the main video data and the sub-video data straddling the projection images of the projector 1A and the projector 1B. The video supply device 3 generates the main video data D1 to be output to the projector 1A and the main video data D3 to be output to the projector 1B from the main video data based on the projection ranges of the projectors 1A, 1B. Similarly, the video supply device 3 generates the sub-video data D2 to be output to the projector 1A and the sub-video data D4 to be output to the projector 1B from the sub-video data straddling the projection images of the projector 1A and the projector 1B.

The projector 1A combines the main video data D1 and the sub-video data D2 with each other to generate the processing target data VD31 shown in FIG. 15A, and the projector 1B generates the processing target data VD34 shown in FIG. 15B. The main video picture VD32 in the processing target data VD31 and the main video picture VD35 in the processing target data VD34 are each a part of the main video picture P41 in the projection image shown in FIG. 15C. In other words, the video supply device 3 generates the data of the main video picture VD32 and the data of the main video picture VD35 from the data of the main video picture P41. Roughly the same applies to the sub-video picture, and the video supply device 3 generates the data of the sub-video pictures VD33, VD36 based on the data of the sub-video picture P42. In this case, in the projectors 1A, 1B, if the edge blend process is performed after performing the dual screen combining process, the luminance on the screen SC is appropriately adjusted, and the preferable video picture can be obtained.

Further, in the projection system 100, it is also possible to provide a plurality of video supply devices 3. The configuration example is shown in FIG. 16 as a first modified example.

Figure 16:
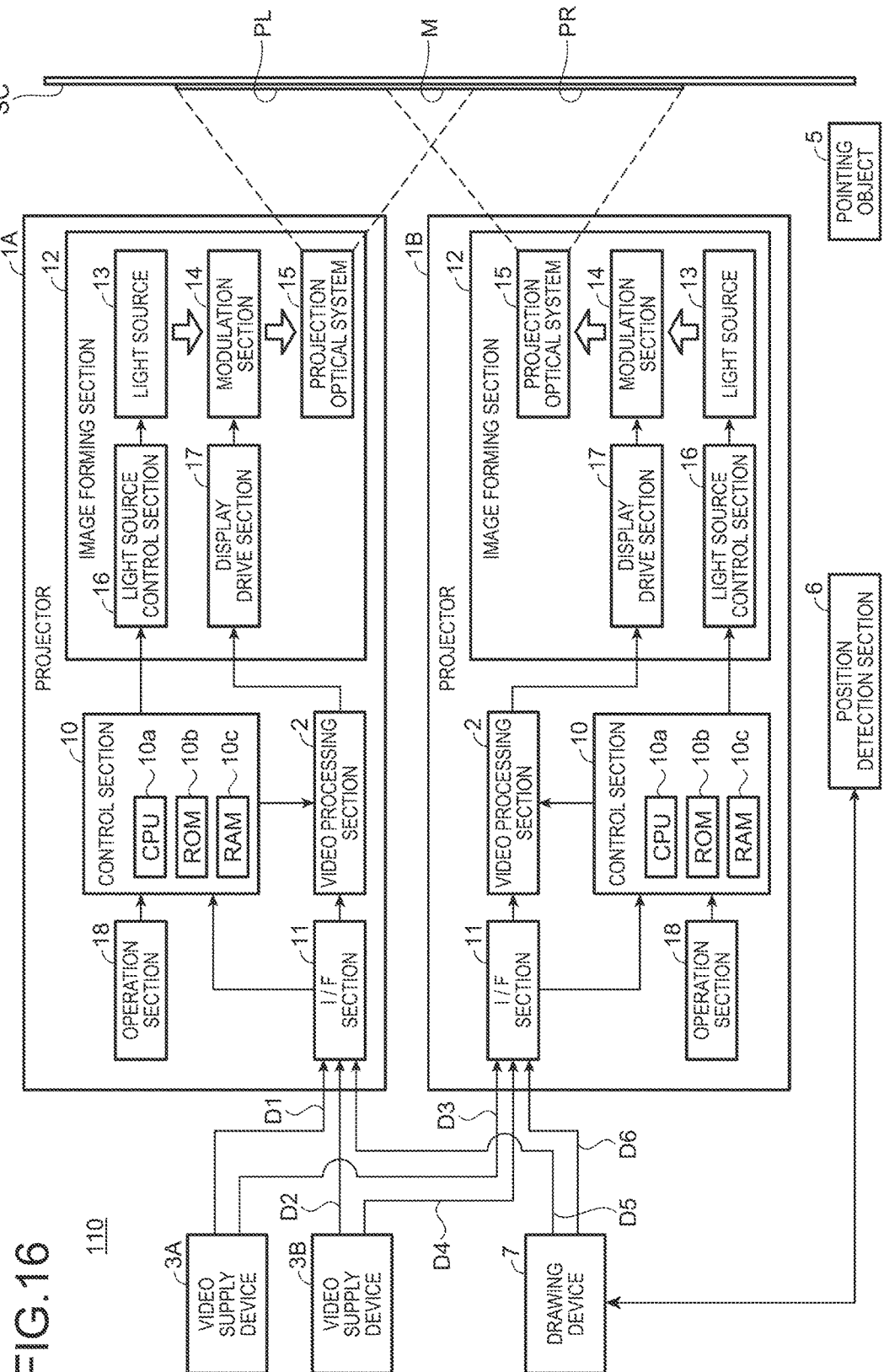
FIG. 16 is a configuration diagram of a first modified example of the projection system.

FIG. 16 is a configuration diagram of the projection system 110 according to the first modified example. In the first modified example, and a second modified example described later, the constituents configured similarly to the embodiment described above will be denoted by the same reference symbols, and the explanation thereof will be omitted.

The projection system 110 is provided with two video supply devices 3A, 3B. The video supply device 3A is a device for outputting the main video data, and outputs the main video data D1 to the projector 1A, and outputs the main video data D3 to the projector 1B. The video supply device 3B is a device for outputting the sub-video data, and outputs the sub-video data D2 to the projector 1A, and outputs the sub-video data D4 to the projector 1B.

In the configuration shown in FIG. 16, substantially the same function as in the embodiment described above can be realized in the case in which the video supply devices 3A, 3B have the main video data and the sub-video data straddling the projection images of the projector 1A and the projector 1B.

The video supply device 3A generates the main video data D1 to be output to the projector 1A and the main video data D3 to be output to the projector 1B from the main video data based on the projection ranges of the projectors 1A, 1B. Similarly, the video supply device 3B generates the sub-video data D2 to be output to the projector 1A and the sub-video data D4 to be output to the projector 1B from the sub-video data straddling the projection images of the projector 1A and the projector 1B.

Thus, as shown in FIGS. 15A through 15C, the main video picture and the sub-video picture straddling the projection ranges of the projectors 1A, 1B can be projected.

FIG. 17 is a configuration diagram of a projection system 120 according to a second modified example. The video supply device 3C provided to the projection system 120 is connected one-to-one to the projector 1B unlike the video supply device 3B (FIG. 16). The video supply device 3C is portable equipment such as a smartphone, a tablet computer, a cellular phone, or a portable media player. The projection system 120 corresponds to a configuration of connecting the equipment described above to the projector 1B with an interface such as HDMI (registered trademark), MHL (registered trademark), Slimport (registered trademark), or Miracast (registered trademark).

In the projection system 120, the sub-video data is not input to the projector 1A. Therefore, in the case in which the sub-video picture is located at the position overlapping the superimposition part M, the sub-video picture is projected only by the projector 1B. Therefore, if the sub-video picture is adjusted in luminance by the edge blend process in the image to be projected by the projector 1B, it results that the luminance of the sub-video picture is rather too low.

In this case, in the layer processing section 50, the dual screen combining process is performed after performing the edge blend process.

Further, as shown in FIG. 15D, in the projector 1A to which the sub-video data is not input, there is generated the processing target data VD41 including the main video picture VD42 and a region VD43 corresponding to the sub-video picture. The region VD43 is, for example, a solid black region.

In contrast, the projector 1B generates the processing target data VD44 including the main video picture VD45 and the sub-video picture VD46 as shown in FIG. 15E. In the processing target data VD44, although the luminance of the left end portion of the main video picture VD45 is adjusted due to the edge blend process, the sub-video picture VD46 is combined (superimposed) after the edge blend process, and is therefore not affected by the edge blend process.

Then, the projection images of the projectors 1A, 1B become the state shown in FIG. 15F. Since the sub-video picture VD46 is superimposed on the region VD43 of the processing target data VD41, the sub-video picture P52 is displayed with appropriate luminance. As described above, even in the configuration in which the data of the sub-video picture is not input to either of the projectors 1A, 1B, by providing the region VD43 without data or low in luminance considering the fact that the superimposition part M is formed, the projection image having the main video picture and the sub-video picture combined with each other can be projected. It should be noted that it is preferable to provide the projector 1A with the information related to the position and the size of the region VD43 from another device. For example, it is possible to output the control data from the video supply device 3 to the projector 1A, or to directly or indirectly transmit the control data from the projector 1B to the projector 1A.

It should be noted that the embodiment and the modified examples described above are nothing more than an example of a specific aspect to which the invention is applied, and therefore, do not limit the invention. Therefore, it is also possible to implement the invention as an aspect different from the embodiment described above. For example, although in the embodiment, there is illustrated the configuration in which the video processing section 2 is incorporated in the projectors 1A, 1B, the invention is not limited to this configuration. It is also possible to, for example, provide the video processing section 2 to a device configured separately from the projectors 1A, 1B. Further, the video processing section 2 is not limited to those formed of the hardware such as an ASIC, but can also be realized by a single processor executing a program. Besides the above, the specific detailed configuration of each of other sections can arbitrarily be modified within the scope or the spirit of the invention.

What is claimed is:

1. An image processing device comprising:
a device that is capable of performing a plurality of types of image processing on processing target data, in case that one of still image data and data of a frame constituting video data is input as the processing target data;
a control section that controls an execution sequence of the plurality of types of image processing so as to change the execution sequence depending on which of the plurality of types of image processing are to be executed for the processing target data, the plurality of types of image processing including a process of varying luminance of an image based on the processing target data in accordance with an in-plane luminance distribution set in advance; and
an output section adapted to output the processing target data having been processed in the execution sequence controlled by the control section.

2. The image processing device according to claim 1, wherein
in at least some types of image processing included in the plurality of types of image processing, the process is executed on the entire processing target data as a processing target.

3. The image processing device according to claim 1, wherein
the control section controls execution and non-execution of each type of image processing included in the plurality of types of image processing to control the execution sequence of types of image processing included in the plurality of types of image processing to be executed.

4. The image processing device according to claim 3, wherein
the execution sequence of the types of image processing is set in advance in accordance with a combination of execution and non-execution of each of the types of image processing.

5. The image processing device according to claim 1, wherein
the plurality of types of image processing further includes a process of superimposing another image on the image based on the processing target data.

6. The image processing device according to claim 1, further comprising:
a plural process execution section adapted to perform the plurality of types of image processing, wherein the control section controls an execution sequence of types of image processing included in the plurality of types of image processing performed by the plural process execution section.

7. The image processing device according to claim 1, wherein
the control section controls the execution sequence in a case of performing the plurality of types of image processing including the process of varying the luminance in accordance with the position in the plane, and a menu on-screen display (OSD) process of superimposing a display object for menu screen on the processing target data with respect to the processing target data so that the process of varying the luminance is performed prior to the menu OSD process.

8. The image processing device according to claim 1, wherein
the control section controls the execution sequence in a case of performing the plurality of types of image processing including the process of varying the luminance in accordance with the position in the plane, and an image on-screen display (OSD) process of superimposing a display object including an additional image on the processing target data with respect to the processing target data so that the image OSD process is performed prior to the process of varying the luminance.

9. A display device comprising:
a device that is capable of performing a plurality of types of image processing on processing target data, in case that one of still image data and data of a frame constituting video data is input as the processing target data;
a control section that controls an execution sequence of the plurality of types of image processing so as to change the execution sequence depending on which of the plurality of types of image processing are to be executed for the processing target data, the plurality of types of image processing including a process of varying luminance of an image based on the processing target data in accordance with an in-plane luminance distribution set in advance; and
a display section adapted to display the image based on the processing target data having been processed in the execution sequence controlled by the control section.

10. The display device according to claim 9, wherein
the control section controls the execution sequence in a case of performing the plurality of types of image processing including the process of varying the luminance in accordance with the position in the plane, and a menu on-screen display (OSD) process of superimposing a display object for menu screen on the processing target data with respect to the processing target data so that the process of varying the luminance is performed prior to the menu OSD process.

11. The display device according to claim 9, wherein
the control section controls the execution sequence in a case of performing the plurality of types of image processing including the process of varying the luminance in accordance with the position in the plane, and an image on-screen display (OSD) process of superimposing a display object including an additional image on the processing target data with respect to the processing target data so that the image OSD process is performed prior to the process of varying the luminance.

12. An image processing method comprising:
inputting one of still image data and data of a frame constituting video data as processing target data;
determining which of a plurality of types of image processing are to be executed on the processing target data;
changing an execution sequence of the plurality of types of image processing depending on which of the plurality of types of image processing are to be executed for the processing target data the plurality of types of image processing including a process of varying luminance of an image based on the processing target data in accordance with an in-plane luminance distribution set in advance;
executing the types of image processing on the processing target data in accordance with the changed execution sequence; and
outputting the processing target data having been processed.

13. The image processing method according to claim 12, wherein
when the plurality of types of image processing includes the process of varying the luminance in accordance with the position in the plane, and an image on-screen display (OSD) process of superimposing a display object including an additional image on the processing target data with respect to the processing target data, the changing of the execution sequence of the plurality of types of image processing includes changing the execution sequence so that the image OSD process is performed prior to the process of varying the luminance.

14. The image processing method according to claim 12, wherein
when the plurality of types of image processing includes the process of varying the luminance in accordance with the position in the plane, and a menu on-screen display (OSD) process of superimposing a display object for menu screen on the processing target data with respect to the processing target data, the changing of the execution sequence of the plurality of types of image processing includes changing the execution sequence so that the process of varying the luminance is performed prior to the menu OSD process.

* * * * *